Dec. 18, 1956     C. B. BROWN ET AL     2,774,821
CARD TRANSLATOR

Filed May 6, 1952     14 Sheets-Sheet 1

CHANNEL OUTPUT CIRCUIT

INVENTORS
C. B. BROWN
L. N. HAMPTON
F. A. THIEL, JR.

BY

ATTORNEY

INVENTORS C. B. BROWN
L. N. HAMPTON
F. A. THIEL, JR.
BY
ATTORNEY

Dec. 18, 1956   C. B. BROWN ET AL   2,774,821
CARD TRANSLATOR
Filed May 6, 1952   14 Sheets-Sheet 3

LIGHT INDEX CHANNEL CIRCUIT

INVENTORS  C. B. BROWN
           L. N. HAMPTON
           F. A. THIEL, JR.
BY
           ATTORNEY

Dec. 18, 1956  C. B. BROWN ET AL  2,774,821
CARD TRANSLATOR

Filed May 6, 1952  14 Sheets-Sheet 5

INVENTORS C. B. BROWN
L. N. HAMPTON
F. A. THIEL JR.
BY
ATTORNEY

Dec. 18, 1956  C. B. BROWN ET AL  2,774,821
CARD TRANSLATOR

Filed May 6, 1952  14 Sheets-Sheet 6

INVENTORS
C. B. BROWN
L. N. HAMPTON
F. A. THIEL JR.
BY
ATTORNEY

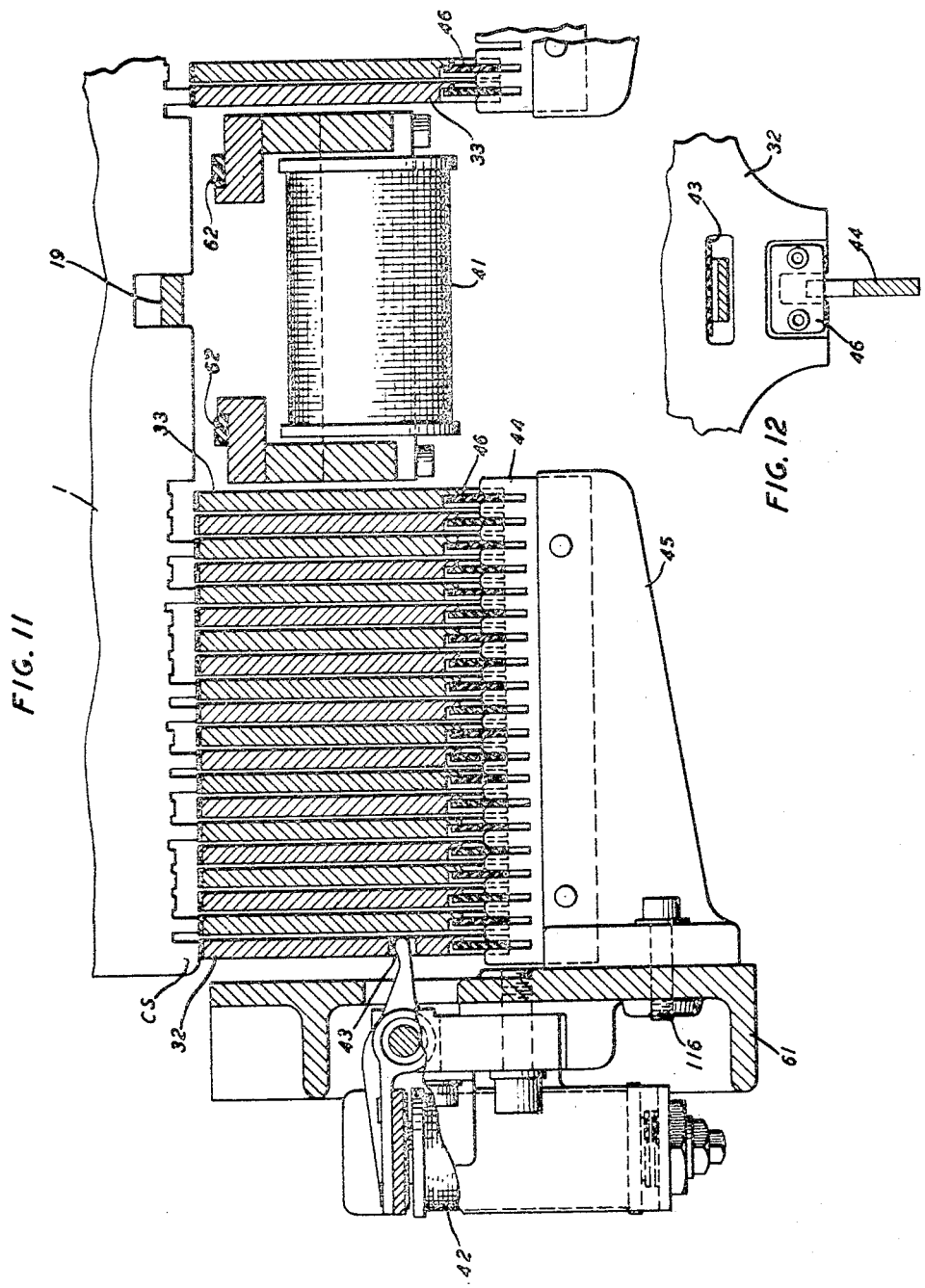

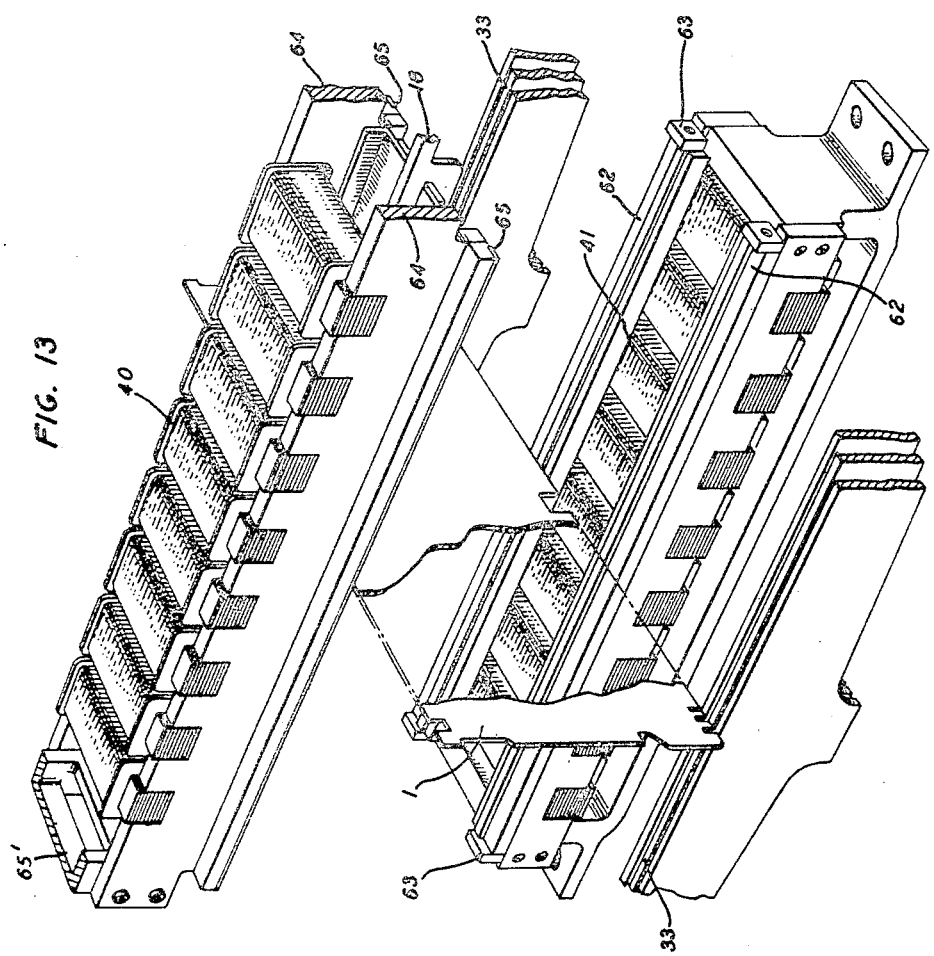

Dec. 18, 1956     C. B. BROWN ET AL     2,774,821
CARD TRANSLATOR
Filed May 6, 1952     14 Sheets-Sheet 9
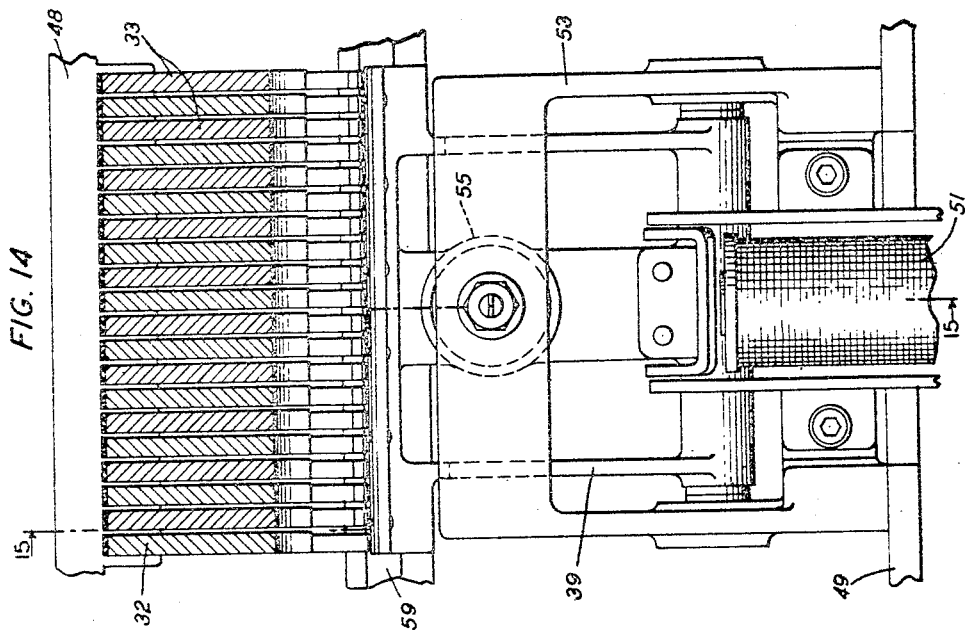
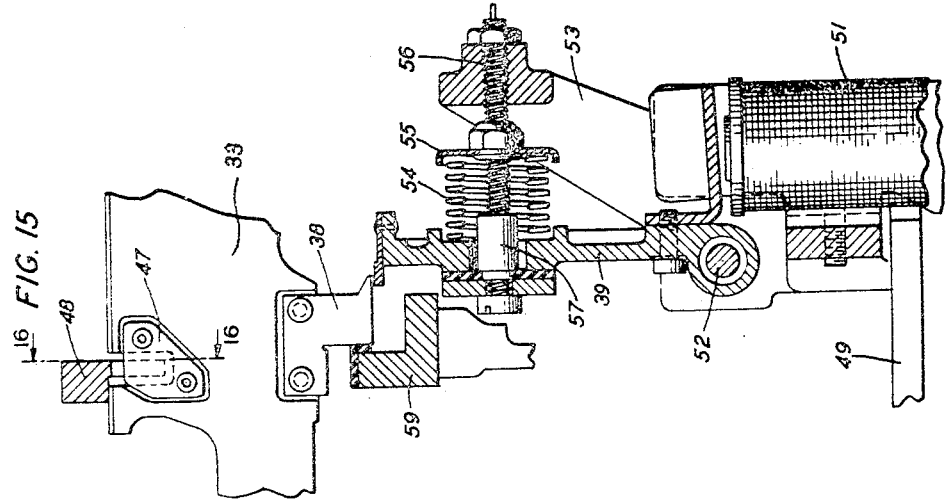
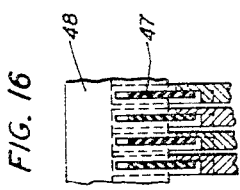
INVENTORS
C. B. BROWN
L. N. HAMPTON
F. A. THIEL, JR.
BY
ATTORNEY Dec. 18, 1956  C. B. BROWN ET AL  2,774,821
CARD TRANSLATOR
Filed May 6, 1952  14 Sheets-Sheet 10
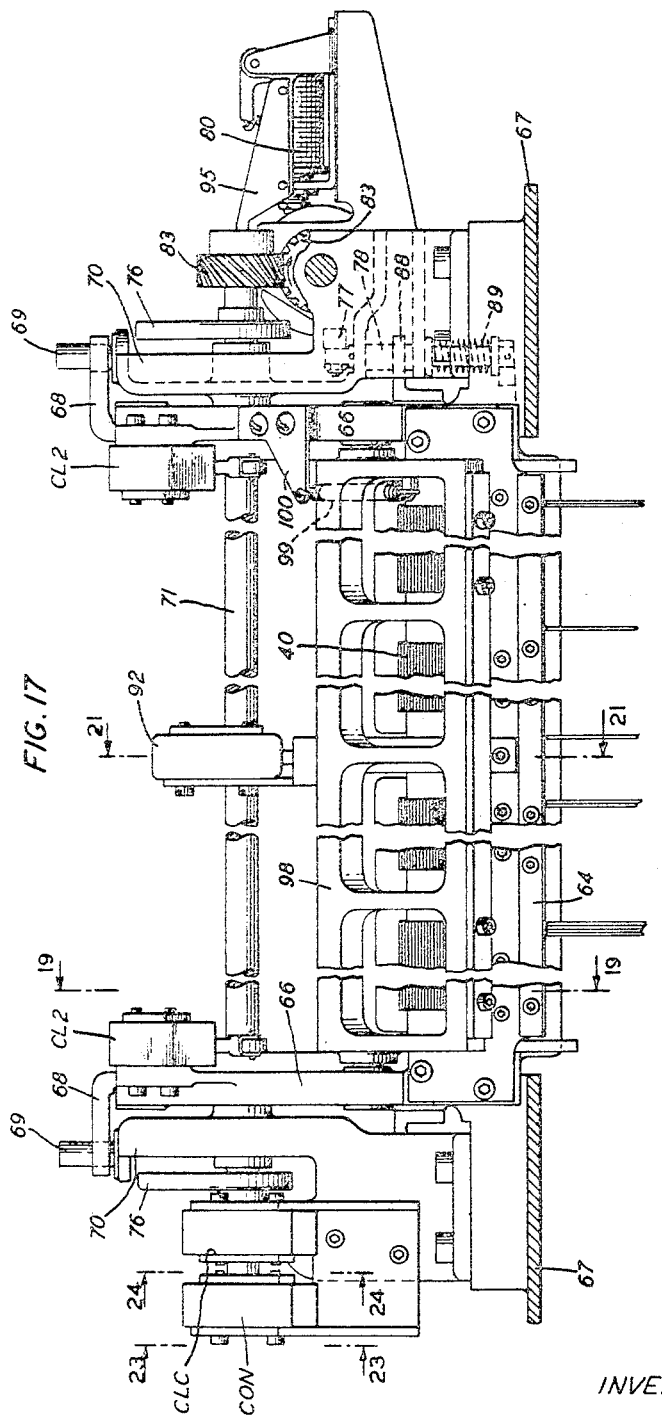
FIG. 17
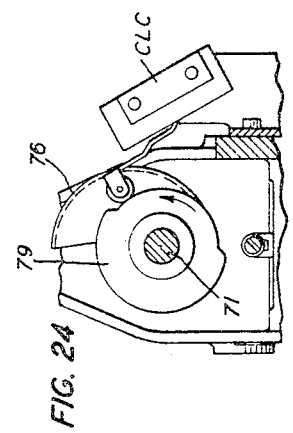
FIG. 24
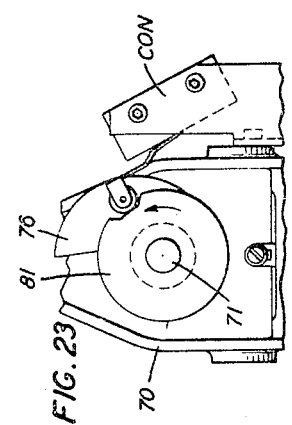
FIG. 23
INVENTORS C.B. BROWN
L.N. HAMPTON
F.A. THIEL, JR.
BY 
ATTORNEY Dec. 18, 1956  C. B. BROWN ET AL  2,774,821
CARD TRANSLATOR
Filed May 6, 1952  14 Sheets-Sheet 11
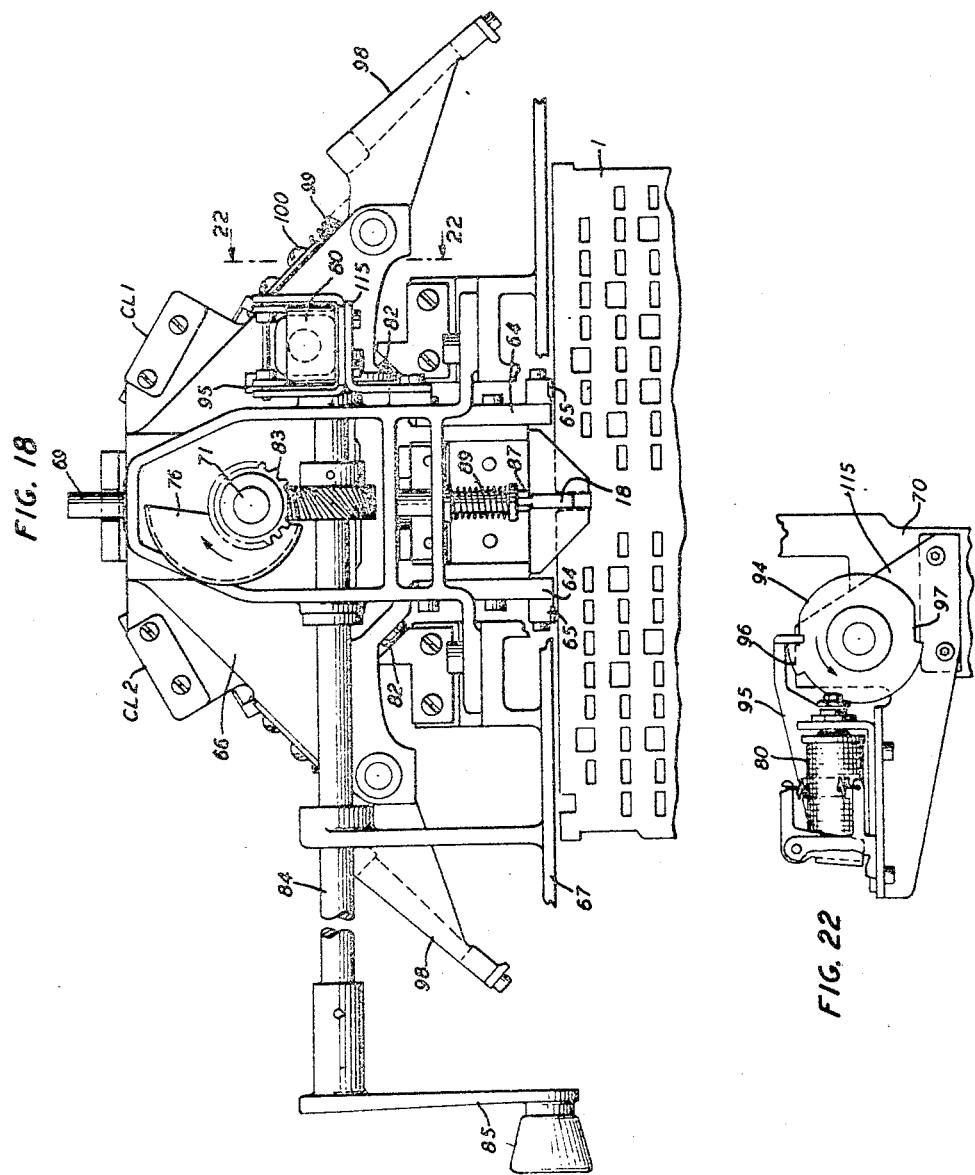
INVENTORS C. B. BROWN
L. N. HAMPTON
F. A. THIEL JR.
BY
ATTORNEY Dec. 18, 1956     C. B. BROWN ET AL     2,774,821
CARD TRANSLATOR
Filed May 6, 1952     14 Sheets—Sheet 12
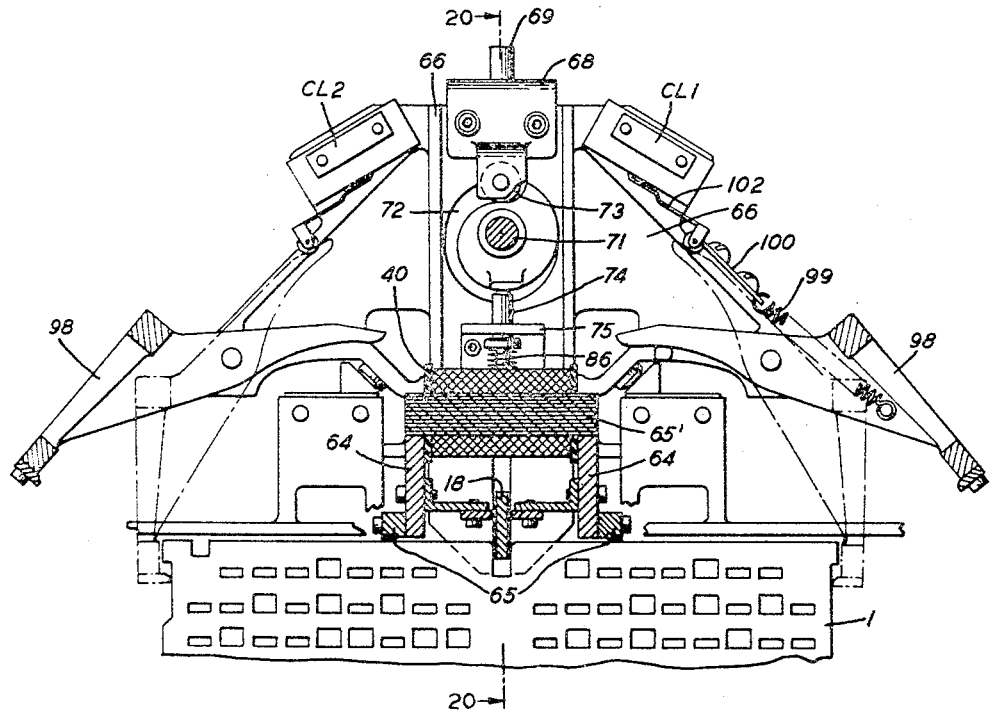
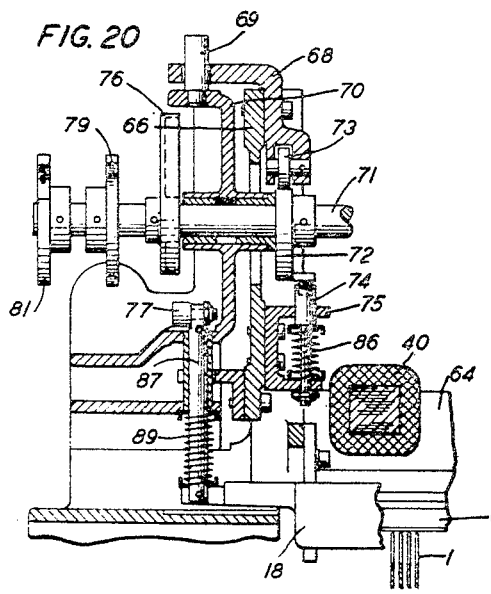
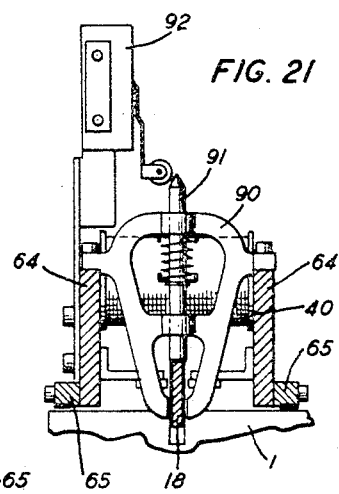
INVENTORS C. B. BROWN
L. N. HAMPTON
F. A. THIEL, JR.
BY
ATTORNEY

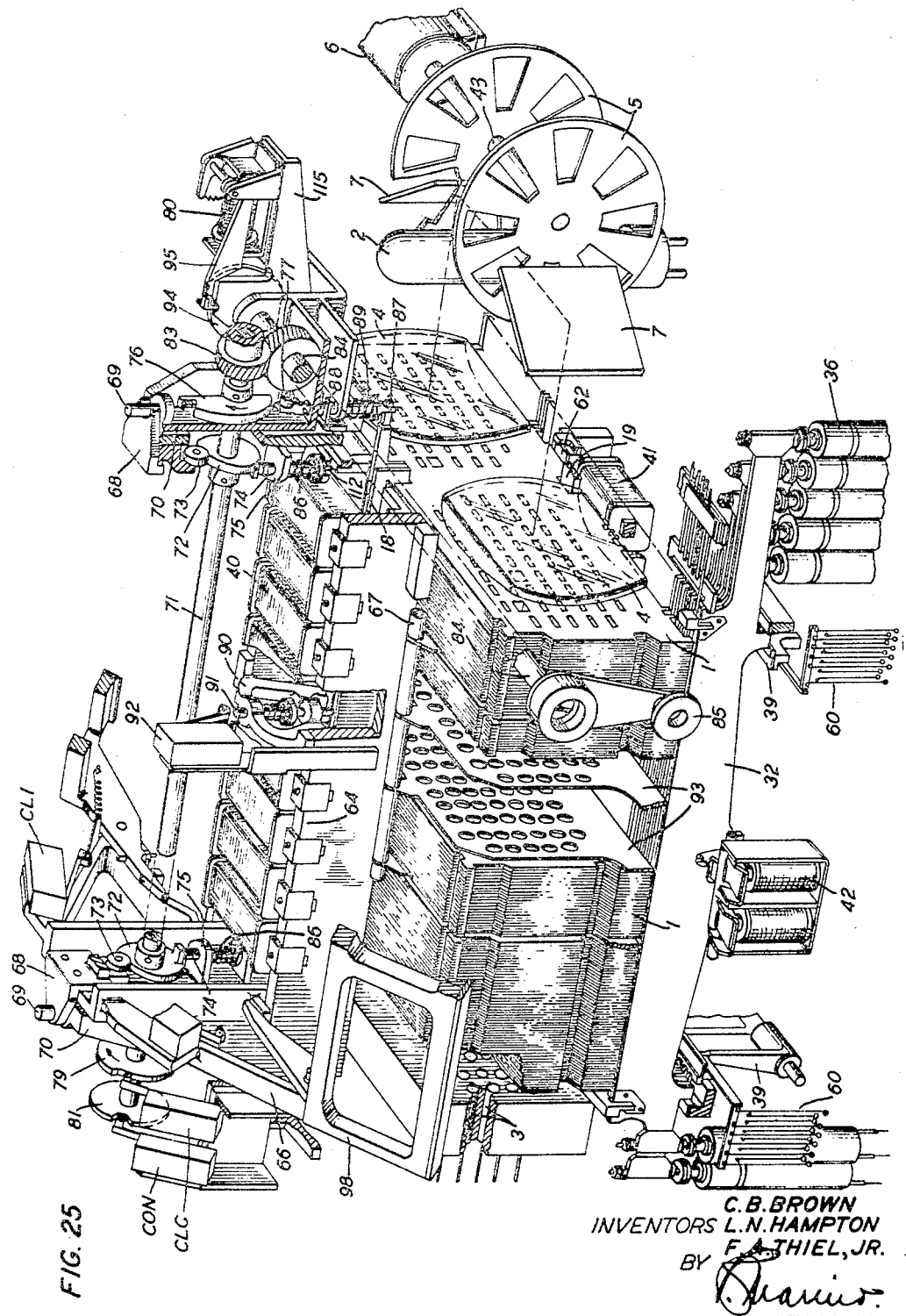

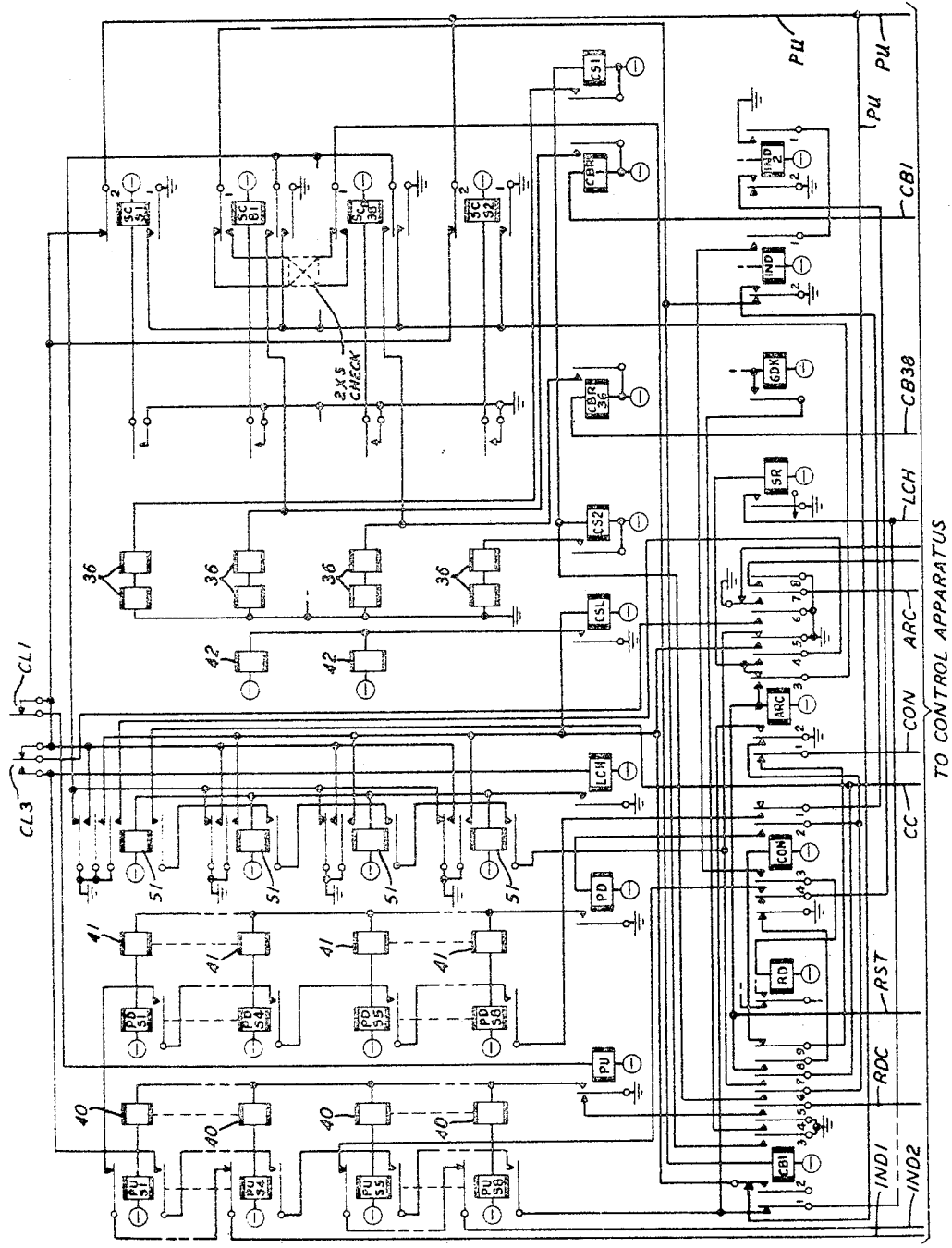

United States Patent Office 2,774,821
Patented Dec. 18, 1956

2,774,821

CARD TRANSLATOR

Clayton B. Brown, Bethpage, Leon N. Hampton, Pleasantville, and Felix A. Thiel, Jr., Brooklyn, N. Y., assignors to Bell Telephone Laboratories, Incorporated, New York, N. Y., a corporation of New York Application May 6, 1952, Serial No. 286,374

17 Claims. (Cl. 179—18)

This invention relates to card translators, and more particularly to translators which employ perforated cards, or plates, of magnetic material held in stackable relation to produce by their perforations channels in the stack through which controlled radiant energy is transmitted to operate an output register in accordance with indications furnished on a card selected or displaced in the stack.

An object of this invention is to provide a fast-acting translator which is compact in form, rugged in construction and easy to maintain.

One feature of the invention is the provision of means whereby the operation of the output register does not take place except on positive indication that a card to be selected or displaced in the stack in response to a given input signal actually has been displaced.

Still another feature of the invention is the provision of certain latching devices in the translator that are used to support the weight of the cards, even though the cards themselves are normally resting on code bars which are to be selectively operated to select a card.

Still another feature of the invention is an arrangement of the above-mentioned latching devices by which the code bars, after being selectively operated, are locked in their operated or non-operated condition by the latches, thereby again to enable said latches to support the weight of the cards during a translating operation;

In the operation of the translator of our invention, the cards comprising the stack are automatically lifted off the code bars prior to their selective operation in order that such operation may take place, unhampered by the cards normally bearing upon the bars. Accordingly, another feature of our invention is the novel use of certain card support bars which sustain the weight of certain of the cards in the event that the latter fail to be lifted off the code bars prior to their selective operation.

These and other features of our invention will be more readily understood from the following description, appended claims and attached drawings in which:

Fig. 11 is a section taken along a line 11—11 of Fig. 9, and shows the card support magnet detail, one half of the code bars, the bottom guide comb therefor, and an end view of the pull-down magnet;

Fig. 12 is a section taken along line 12—12 of Fig. 10 and shows the detail of that portion of a card support bar which engages a guide-comb tooth, and also the opening in the bar to engage the armature extension of the card support magnet;

Fig. 13 shows in outline the magnetic circuit of the card translator;

Fig. 14 is a section taken along the line 14—14 of Fig. 9 and shows the front view of one of the latch magnets and the mechanism controlled thereby;

Fig. 15 is a section taken along the line 15—15 of Fig. 14 and shows the latch magnet mechanism shown in Fig. 14;

Fig. 16 is a section taken along the line 16—16 of Fig. 15 and shows the upper comb detail;

Fig. 17 is a front elevation of the mechanism for lifting the pull-up magnet structure;

Fig. 18 is a right-end view of the mechanism shown in Fig. 17;

Fig. 19 is a section taken along the line 19—19 of Fig. 17;

Fig. 20 is a section taken along the line 20—20 of Fig. 19;

Fig. 21 is a section taken along the line 21—21 of Fig. 17;

Fig. 22 is a view taken along the line 22—22 of Fig. 18, particularly showing the crank-locking mechanism;

Fig. 23 is a view taken along the line 23—23 of Fig. 17, showing the crank-lock normal switch;

Fig. 24 is a section taken along line 24—24 of Fig. 17;

Fig. 25 is a perspective drawing representing a three-dimensional view of the card translator, omitting all frames and supporting structure; and Fig. 26 is a circuit schematic for the electrical control for the operation of the translator.

The card translator of our invention makes use of tunnels, or channels, established by identically located holes in each one of a group of cards held in stackable relation, and by enlarged holes in a card displaced in the stack that closes all channels except the ones for which the displaced card provides enlarged holes. Each of the channels is utilized for the transmission of a suitable form of energy, thereby to activate, if the channel is open, a suitable energy responsive device located at the other end of the channel and in alignment therewith, and to deactivate said device when the channel is closed by the displacement of a card, or for any other reason. It is apparent from this that when the cards are normally stacked, all the channels are open, and if energy is transmitted through each of the channels, all of the devices will be activated. When, however, a card is displaced and certain of the channels are closed thereby, the devices in line with the closed channels will be deactivated while those in line with the open channels will remain activated. It is further apparent that if each card has a different pattern of enlarged holes, the displacement of each card in the stack will produce a pattern of activated and deactivated devices which is identical with the pattern of enlarged and unenlarged holes in the displaced card.

Figure 1:
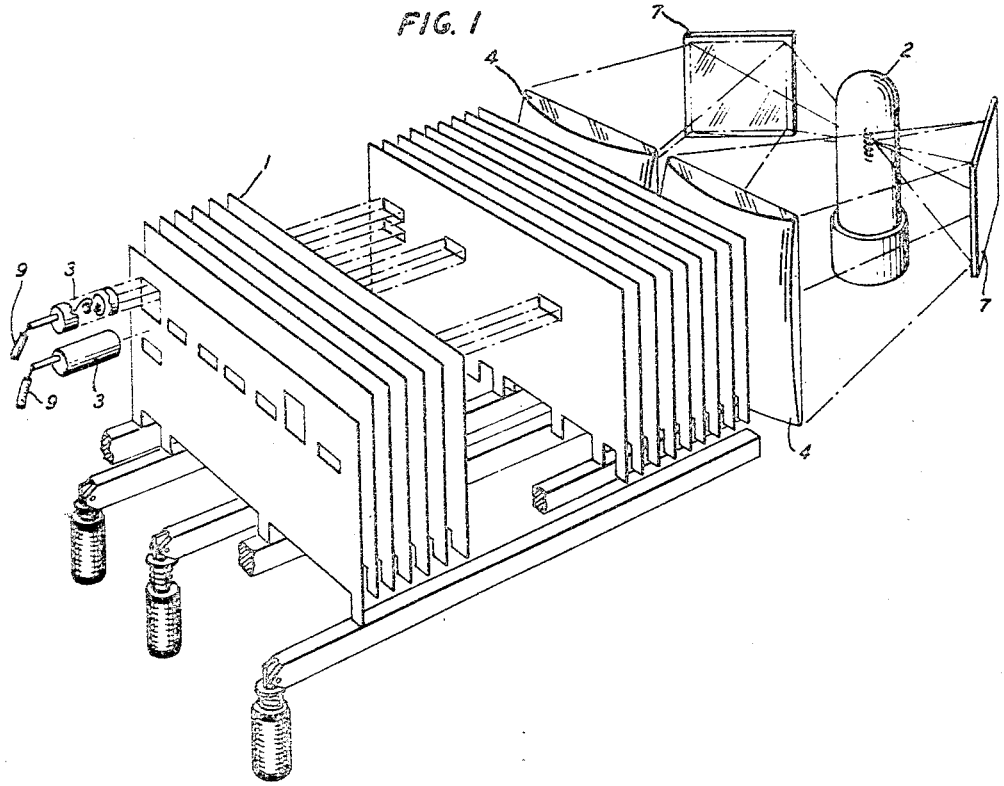
Fig. 1 is a perspective schematic of the principle of the translator.

Referring to Fig. 1 which illustrates the above principle (and also, in all cases, to Fig. 25, which shows the translator in perspective, with frames and other supporting structures removed for the sake of clarity), a number of cards 1 with identically located rectangular holes are disposed in stacked relation to each other. A source of light 2 or other form of radiant energy is positioned in front of the stack, between which and the source are located one or more collimating lenses 4. The light is reflected by the two mirrors 7 to the lenses as shown in the figure, and the lenses then direct the light in parallel rays through the holes in the cards. It is evident that if the cards have an equal number of holes in the same relative position, and said cards are held in a stacked relation as shown, there will be formed through the stack as many channels as there are holes, through each of which the light is transmitted.

Mounted in line with each hole in the last card of the stack is positioned a device 3 which is responsive to the energy transmitted through the channel. In the present case, and since the preferred form of the invention is being described and illustrated herein with respect to the use of light as the form of energy transmitted through the channels, the device 3 would be light sensitive, such as a phototransistor for example, or other form of photoelectrical element the electrical resistance of which decreases when light impinges upon it and increases when the light is removed, as would be the case if the channel is closed. It is understood, of course, that the devices 3 are each suitably enclosed in a grounded container that shuts off light to the device from any source other than the light transmitted through the channel to which it appertains. It is evident, therefore, that when light is transmitted through all the channels, all of the devices 3 are illuminated and activated, each to effect, if desired, an electroresponsive element in circuit with the device.

However, if the cards 1 are so formed that some of the holes are enlarged by the width of a normal hole or more, and if any one of the cards is then displaced downward in the stack by an amount equal to or greater than the width of the normal hole, the channels formed by the normal holes will be closed to the transmission of light beyond the displaced card, while those which are not so closed by the enlarged holes will remain open to the transmission of light. In consequence, the devices 3 appertaining to the closed channels will be deactivated since light will no longer illuminate said devices, while the devices 3 appertaining to the still open channels will continue to be activated. Thus by the displacement of a card 1 in the manner indicated, it is possible to continue the operation of those devices 3 which appertain to those channels for which the displaced card provides enlarged holes, and to stop the operation of those devices which appertain to channels for which the displaced card does not provide enlarged holes. If each card 1 has enlarged holes in different locations, then the displacement of each card will produce a different pattern of operated and non-operated devices 3.

As previously stated (and as is well known) when the photoelectric device 3 is illuminated, its ohmic resistance decreases, and when it is not illuminated said resistance increases. This property of the photoelectric device 3 is utilized to control the operation of the channel output circuit shown in Fig. 2. In connection with this circuit it should be mentioned that the dynamic characteristics of photoelectric devices are, in general, more stable than their static characteristics, which fact makes it desirable to modulate the light illuminating such devices and thereby to produce a variable current through the circuits thereof. This variable current may then be changed into an alternating current and stepped up to a voltage suitable to operate any other device or piece of apparatus.

For the purpose of modulating light from source 2, two light modulating discs 5 (see Fig. 25) each provided with eight pie-cut apertures are mounted on the shaft 43 intermediate the lamp 2 and the mirrors 7. These discs are rotated through the shaft 43 by the motor 6, the speed of said motor being such that the light from the lamp 2 is interrupted approximately 400 times per second, by way of example, thereby to produce in the circuit of Fig. 2 a current having a steep wave front and a substantial wave area. The interrupted or modulated light is reflected by the mirrors 7 to the collimating lenses 4 which, as previously stated, direct the light in parallel rays through the channels formed by the card stack.

Figure 2:
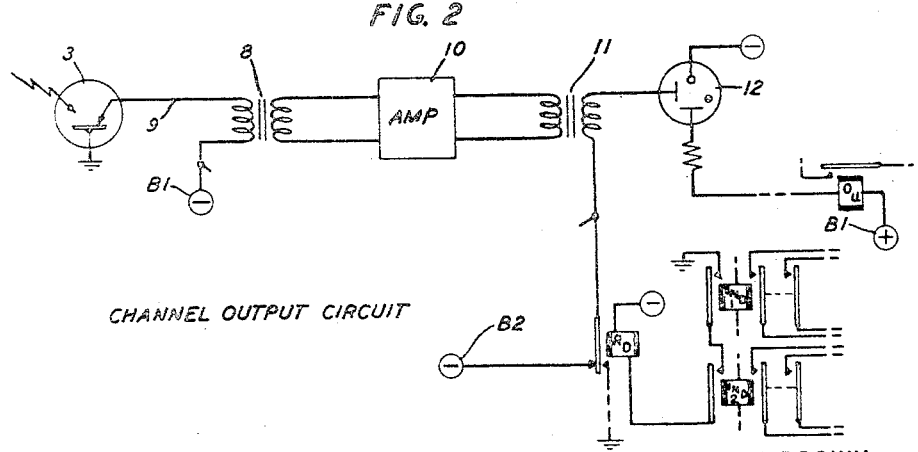
Fig. 2 shows the channel output circuit.

Referring now to Fig. 2 which shows a typical channel output circuit responsive to a device 3, and of which one such circuit is provided for each output channel, when the modulated light passing through a channel impinges upon the device 3, the variable current flowing through the circuit extending from ground through device 3 (said devices 3 being all grounded as previously stated), conductor 9, primary winding of stepdown transformer 8, battery −B1, to ground, induces an alternating current in the circuit through the secondary winding of said transformer and the amplifier 10, the latter being of any suitable design. Said amplifier 10 amplifies the current in the circuit completed therethrough and the primary winding of stepup transformer 11. Thus the variable current produced in consequence of the variable illumination of device 3, is changed into an alternating current of low voltage (the latter to match the impedance of the amplifier 10), whereupon said current, upon amplification, is utilized to produce an alternating high voltage at the terminals of the secondary winding of transformer 11 for as long as modulated light continues to impinge upon the device 3. This voltage is applied to the control anode of a cold cathode gas-filled tube 12.

As will be explained later, the card translator of our invention is so arranged that the involved channel output circuits produced by displacement of a card 1 are not rendered effective unless and until a positive signal is received that the card has actually been displaced by a predetermined amount in the stack. This signal is furnished by the operation of relays IND1 and IND2 which, in operating, close an obvious circuit for relay RD. Prior to the giving of this signal, that is prior to the operation of relays IND1 and IND2 and the consequent operation of relay RD, and even though the required card 1 has been displaced to cause the several channel output circuits to be rendered effective in severally producing a voltage that will be applied to the control anode of their respective tubes 12 as above described, bias battery −B2 is applied over the back contacts of relay RD to the secondary winding of transformer 11 of all channel output circuits, and therefrom to the control anodes of their respective tubes 12. This negative bias neutralizes the positive half cycles of the voltage induced in the secondary winding of transformer 11 in each channel output circuit whose photoelectric device 3 remains illuminated by the variable light transmitted through its associated channel, thus keeping tube 12 of each channel output circuit in a non-conductive state. When, however, relay IND1 and relay IND2 are operated in response to the positive signal that a card 1 has been displaced in the stack, relay RD is operated, and ground through its front contacts is applied to the secondary winding of transformer 11 in all channel output circuits, whereupon the signal voltage produced by the positive half cycles in each channel output circuit whose device 3 is illuminated, is rendered effective to break down the gap between the control anode and cathode of tube 12, said cathode having negative battery permanently connected thereto as shown. In consequence, conduction through the main gap of the tube follows to complete the circuit of the output relay OU, through the winding of which positive +B1 is supplied to the anode of tube 12. In our invention, this voltage is supplied through the relay OU (or other device) which operates over the circuit completed through the main gap of the tube 12, and remains operated for as long as modulated light continues to illuminate the device 3. Relay OU, in operating, then performs whatever function is assigned to it.

In some cases it is desirable to actuate the channel output circuits upon signal that only one of the relays IND1 or IND2 has been operated, and to provide an alarm that both relays have not been operated. In such an event, the wiring of the left contacts of relays IND1 and IND2 may be changed to complete the circuit of relay RD upon the operation of either relay IND1 or relay IND2, and to provide an alarm circuit through other contacts (not shown) of said relays IND1 or IND2 which will be completed upon the operation of either relay but not both. Such a simple modification of the circuit for operating relay RD, the provision of an alarm device, and the provision of a circuit therefor through additional contacts on relays IND1 and IND2, are obvious to persons skilled in the art.

Figure 3A:
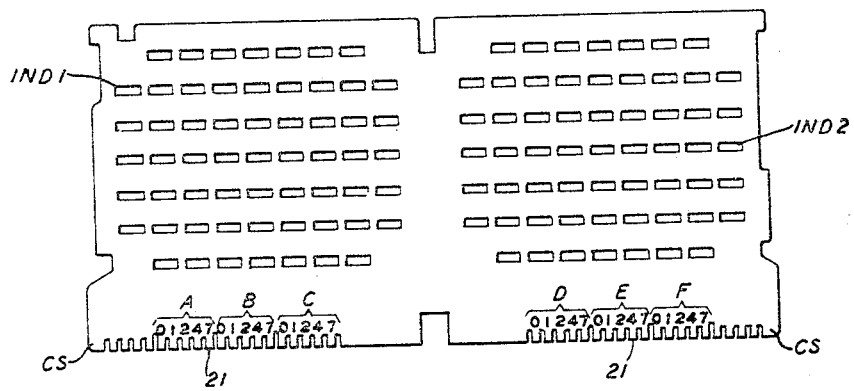
Fig. 3A shows a blank card.
Figure 6:
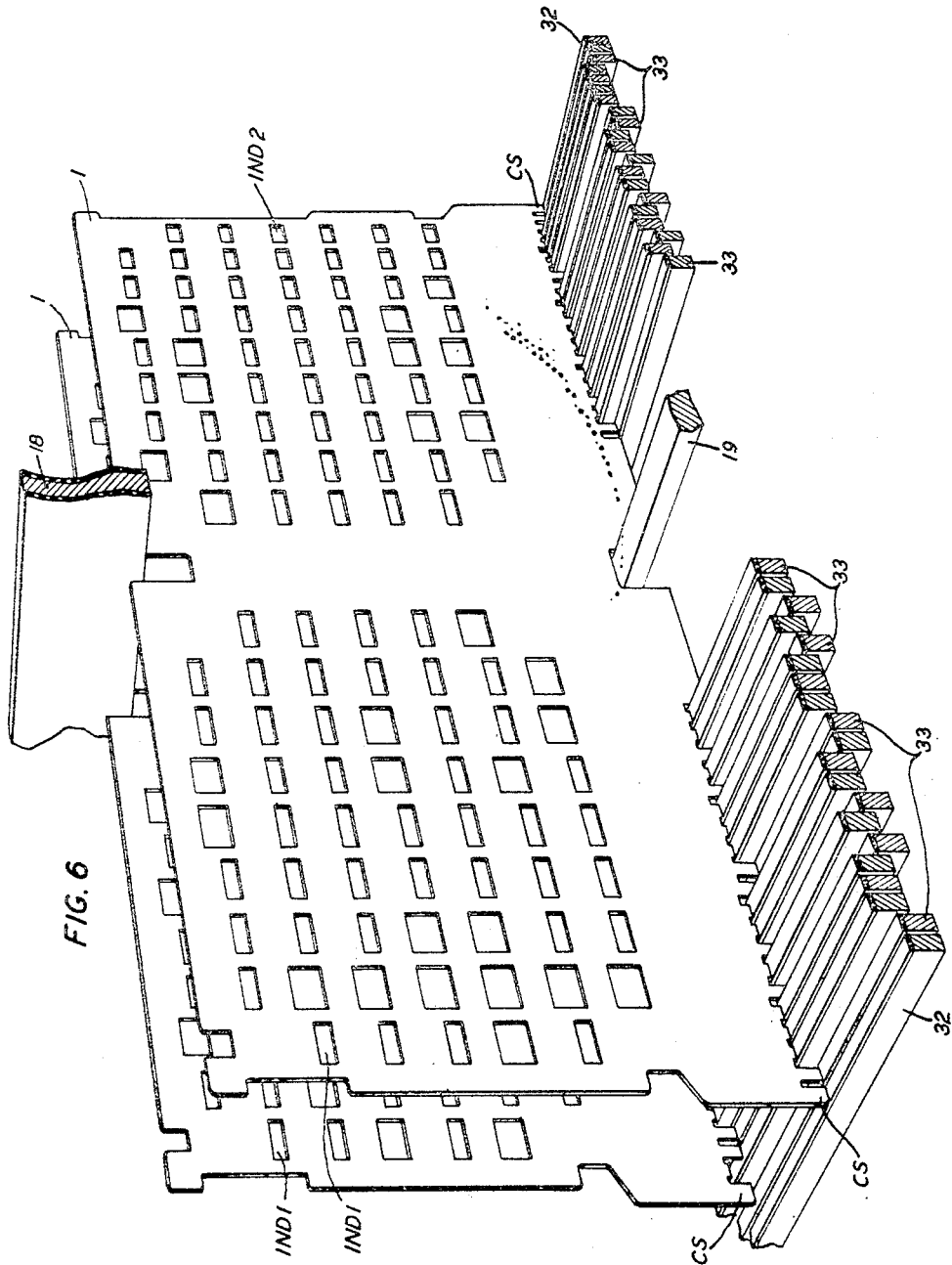
Fig. 6 is a perspective showing of the relation between a selected card and an unselected card, with the code bars in selected position to support both cards.

The cards 1 indicated in Fig. 1 have, in the present embodiment of the invention, the configuration indicated in Fig. 3A. This figure shows the card in "blank," that is, before it is modified to enable its selection, or displacement, in the stack, and to enable it by such displacement to close certain of the channels and to maintain open the remainder of the channels. The "cards" (which are, in reality, plates) may be of any suitable magnetizable material of flat thin stock, preferably of magnetizable sheet steel, each perforated in the body thereof with uniform rectangular holes in horizontal and vertical alignment, as shown in Fig. 3A, and with aligned central guide notches on the top and bottom by which the card is slidably held in the position determined by the location of vertically movable upper guide bar 18 and the fixed bottom guide bar 19, as shown in Fig. 25 and also in Fig. 6. The bottom of the card is notched to contain an equal number of tabs 21 on either side of the bottom guide notch, the rectangular holes in the body of the card being also preferably divided into two groups, one on each side of both the guide notches, as shown.

In the present embodiment of the invention each card 1 is provided with forty tabs in all, twenty on each side of the bottom guide notch, the two outer tabs CS being used to support the card under certain conditions of operation, as will be described later, while the remaining thirty-eight tabs 21 are the "code" tabs by which the selection or displacement of the card in the sack is effected.

The card translator of our invention finds one use in cooperation with switching facilities for the automatic establishment of telephone connections, either on a local basis or a nationwide basis. Particularly in relation to the latter, the involved telephone switching system necessitates the use of a nationwide numbering plan including, for example, all of the United States and parts of Canada. Under this plan, every telephone that can be reached by the system is identified by a 10-digit code, 11 digits in the case of party lines. The 10-digit code is made up as follows: A 3-digit "area" code, a 3-digit office code and a 4-digit number. For example, the New York telephone number CH 3–1000 might be identified in the national numbering plan as follows: New York area code 212, office code CH3 (or 243) and 4-digit number 1000. Thus by dialing 10 or 11 digits, a toll operator (or subscriber) would be able to complete a call to any dial telephone in the United States and parts of Canada which may be reached over an existing network of trunk lines.

In adapting the card translator of our invention for use in a telephone switching system of the kind above briefly indicated, it is the function of the translator to furnish the routing information for the call on the basis of the called office code (243, for instance) and the code of the area (212) in which the called office is located, translating these codes into information required by the common control switching equipment to route the call to the wanted office. This function is referred to as a 3-digit or 6-digit translation, depending on whether the call is to be completed within the area in which both the calling office and called office are located, in which event only the three digits of the called office require translation, or on whether the two offices are in different areas, in which event the three digits of the called area and the three digits of the wanted office in that area both require translation. Thus the card translator of our invention, when adapted for use to telephone switching operations, may be compared to a "directory" each page of which contains routing information for a particular called code, whether it is a 3-digit code or a 6-digit code. Each page of the "directory" is marked by the called office code whose routing information it contains, so that when, for example, the switching equipment in an office receives the code of a called number, said equipment refers, so to speak, to the "directory" for the information on how the call should be routed. The page of the "directory" that contains the called code is then selected by the inquiring apparatus through its recognition on some particular page of the marks thereon which express the called code, whereupon the routing information contained on that page is utilized by the apparatus to complete the connection to the distant office.

In the card translator of our invention, when adapted to automatic telephone switching, the cards 1 correspond to the pages of the "directory" to which the translator has been compared, the called office code represented by the card is recorded on the bottom edge of the card, and the routing information appertaining to the code is recorded in the body of the card. The called code and the routing information corresponding thereto are recorded on the card in the following manner:

Referring again to Fig. 3A, the bottom edge of the card is notched to contain the forty tabs 21, twenty on each side of the bottom guide notch, as has already been noted. Fifteen of the tabs immediately to the left of the notch are reserved for the three digits of the called office code, while the fifteen tabs immediately to the right of the notch are reserved for the three digits of the called "area" code. Five tabs in each of these two groups are reserved for each digit of the code, and the particular value of each digit is recorded in the well-known two-out-of-five code, by way of example, by two tabs out of the five that are reserved for the digit. For convenience of identifying the particular value of the digit expressed by the tabs in a group, each tab in the group is given a numerical designation such that when, in the two-out-of-five code above referred to, the numerical designations of the two tabs are added together their sum will express the value of the digit designated by the two tabs. This will be true for all digital values except 0. Thus the tabs in each group of five are given the respective designations 0, 1, 2, 4 and 7, as indicated in Fig. 3A, and the values of the digit expressed by the combination of two tabs out of the five is as follows:

| Digit: | Tabs |
|---|---|
| 0 | 4, 7 |
| 1 | 0, 1 |
| 2 | 0, 2 |
| 3 | 1, 2 |
| 4 | 0, 4 |
| 5 | 1, 4 |
| 6 | 2, 4 |
| 7 | 0, 7 |
| 8 | 1, 7 |
| 9 | 2, 7 |

Figure 3B:
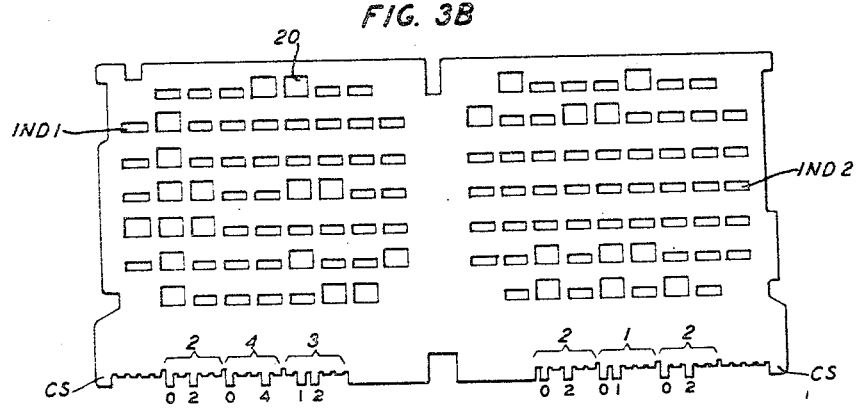
Fig. 3B shows a card which has been coded for selection and translation.
Figure 3C:
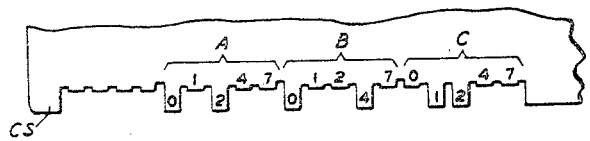
Fig. 3C is an enlargement of the left lower portion of the card shown in Fig. 3B.

With the above in mind, it is clear that to record on a card 1 the digits of a given office code, whether the code be that of a 3-digit code or a 6-digit code, it is only necessary to retain in each of the group of five tabs reserved for a digit the two tabs that are necessary to express the digit, removing the remaining three tabs. Thus, for example, if it is desired to record the code 243 (CH3) on the fifteen tabs to the left of the lower guide notch, the digit 2 (the A digit) would be recorded by removing the tabs 1, 4, and 7 from the A group of tabs, leaving the two tabs 0 and 2, as indicated in Figs. 3B and 3C (the latter figure being but an enlarged fragmentary showing of the left lower portion of the card indicated in Fig. 3B); the digit 4 (the B digit) would be recorded by removing tabs 1, 2 and 7 from the B group of tabs, leaving the two tabs 0 and 4 to record the digit 4, while the digit 3 (the C digit) would be recorded by removing the tabs 0, 4 and 7 from the C group of tabs, leaving the two tabs 1 and 2 to record the digit 3. The three digits of the "area" code are similarly recorded on the fifteen tabs immediately to the right of the lower guide notch, the area code 212 (D, E, F digits) and the office code 243 (A, B, C digits) for example, being shown in full along the lower edge of the card shown in Fig. 3B.

There are certain extra tabs provided along the lower edge of the card. These tabs may be utilized to record whatever additional coded information may be required for use in conjunction with the code digits to select a card. If these extra tabs are not used, they are removed, as shown in Figs. 3B and 3C. If the extra tabs are used, then only those expressing in code the additional information required will be retained, while the rest are removed. In general, it is sufficient to say that except for the two end support tabs CS which are never removed, all other tabs not utilized as parts of wanted codes or otherwise required for the selection of a card, are removed. Thus, for example, if the card is one for a 3-digit code only (digits A, B, C) the fifteen tabs reserved for the D, E, F digits to the right of the guide notch would also be removed.

The routing information required by a code (3 or 6 digits) recorded along the lower edge of a card in the manner above described is recorded on the card by enlarging by the width of a rectangular hole each of the involved rectangular holes in the body of the card. Each hole so enlarged, as for example the hole 20 in Fig. 3B, has a certain meaning for translation, and the object of the hole enlargement is to maintain open the channel established through the card stack by said hole when said latter card is downwardly displaced in the stack by the width of an unenlarged hole. On the other hand, if the hole is not enlarged, then the downward displacement of the card in the stack by the width of the regular hole will cause the channel to be closed, since the channel will be covered up by the surface of the displaced card immediately above the hole. Thus, if we consider as an example the channel formed by the corresponding unenlarged hole below the hole 20 in each of the cards when stacked, then the downward displacement of a card by an amount equal to the width of the hole will close the channel of which the hole is a constituent part, since the card surface immediately above the upper edge of the hole will then occupy the place occupied by the hole prior to the displacement, thereby closing the channel to the transmission of energy beyond the displaced card. However, if a hole is enlarged, such as hole 20 for example, by the width of a regular hole, then the downward displacement of the card will not close the channel of which hole 20 is a constituent part, since the card surface that would have closed the channel upon the displacement of the card, had that surface been present, has been removed by the enlargement of the hole, thus leaving the channel open to the transmission of energy therethrough when the card is displaced. It is evident that by enlarging on each card the appropriate holes expressing the translation required by the office code recorded along the lower edge of the card, the downward displacement of the card in the stack by the width of an unenlarged hole will have the effect of maintaining open all the channels through the card stack of which the enlarged holes on the displaced card are constituent parts, and closing all the other channels. The light or other form of energy transmitted through the open channels then impinges upon the devices 3 to cause their actuation and the subsequent operation of their respective channel output circuits, shown in Fig. 2 and previously described, when relays IND1 and IND2 have both been operated to indicate that the selected card has been displaced.

At this point it should be mentioned that there are two corresponding holes in each of the cards 1 which are not enlarged. The two channels formed by said holes are used in the manner to be described to indicate that a card has in fact been downwardly displaced in the stack by the required amount and firmly seated in the displaced position. These two holes are designated IND1 and IND2 on the card illustrated in Fig. 3B, are respectively located on the two outer columns of holes, and the channels formed by corresponding holes in all the cards of the stack are designated as "light index channels." From what has already been said, it is evident that when all the cards are in the stack and none of them is displaced, light will pass through both light index channels IND1 and IND2 (as well as all the other channels) to activate the photoelectric elements 3, respectively located at the ends of the channels, and to cause thereby the operation of the light index channel circuit shown in Fig. 4, of which one is provided for each channel. When, however, a card is "selected" by downward displacement as hereinafter set forth, and the card has in fact dropped to the required position, the displaced card closes the two light index channels IND1 and IND2, in consequence of which the photo-electric elements 3 of the two index channel circuits are deactivated and the circuits of which they are a part operated to energize the relays IND1 and IND2, respectively. As previously described, the operation of said relays IND1 and IND2 completes the circuit of relay RD which, upon operation, functions to make the channel output circuits effective and thereby produce the translation indicated by the displaced card.

Figure 4:
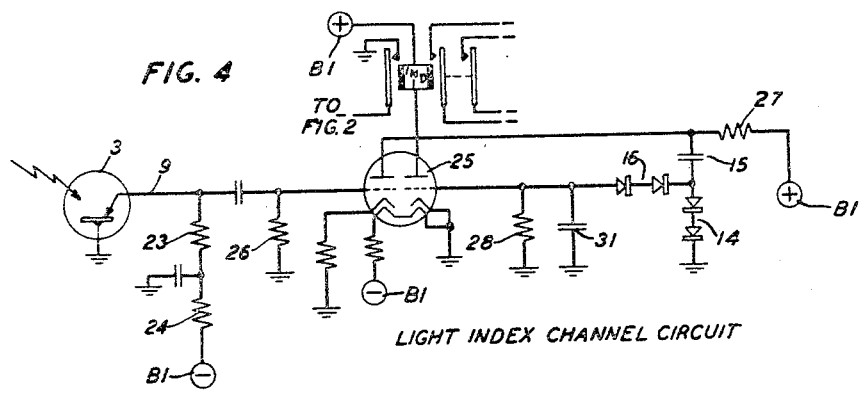
Fig. 4 shows the light index channel circuit.

Referring now to the light index channel circuit shown in Fig. 4, when no modulated light falls upon device 3 of an index channel (say index channel IND1) because a card 1 has been displaced in the stack to cut off the light from the channel, the vacuum tube 25 will conduct through both halves of its envelope, since the left grid is at ground potential through resistor 26 and the right grid is at ground potential through resistor 28, the left anode of the tube being supplied by positive battery +B1 through resistor 27 and the right anode being supplied by battery +B1 through relay IND1. Relay IND1 operates under the above conditions and closes its contacts, thereby to complete a partial path for the relay RD of the channel output circuits, said latter relay operating when relay IND2 of the second light index channel circuit (identical to the circuit shown in Fig. 4) operates in response to the absence of light upon the photoelectric element 3 of said circuit, the operation of both of said relays furnishing, as said before, the indication that a card 1 has been correctly displaced in the stack.

It should be noted that the unvarying current that flows through the left side of the tube 25, resistor 27 and positive battery +B1 is prevented by capacitor 15 from flowing in the network connected to the right grid of tube 25. Therefore the circuit of relay IND1 will remain undisturbed so long as no light falls on the photoelectric element 3; that is, so long as a card has been selected and the light index channel closed to the transmission of light therethrough. When, however, all the cards 1 are in the stack and none of them is selected, modulated light is transmitted through both light index channels. Considering the effect of the modulated light transmitted through the light index channel IND1 (the circuit illustrated in Fig. 4), the variation in the resistance of the photoelectric element 3 causes a variable current to flow through the circuit extending from ground, the device 3, conductor 9, resistor 23, resistor 24, negative battery −B1 to ground. This current will produce a variable potential of positive and negative values which is applied to the left grid of tube 25, thus to produce a variable current through the left half of the tube. On positive half cycles of potential, current flow through the left portion of the tube increases to lower the potential of its anode to less than its normally positive value determined by resistor 27, and this reduced potential is applied through capacitor 15 and varistor network 14 to ground. The polarity of varistor network 14 is such that a negative potential drop is produced across it. This potential is applied through varistor network 16 to the right grid of the tube and to capacitor 31 which charges to this polarity. Conductivity through the right half of the tube is therefore lowered to the point where the current flow is insufficient to maintain the operation of relay IND1, in consequence of which said relay releases. On the negative half cycle of potentials, the left grid of the tube is rendered negative, reducing conductivity through the latter half of the tube and increasing the positive potential of the left anode. This increased potential is applied through capacitor 15 and varistor network 14 to ground. In this case, however, the polarity of varistor network 14 is such that its resistance is very small, thereby placing the common terminal of capacitor 15 and varistor networks 14 and 16 at almost ground potential. The very slight positive potential is further suppressed by varistor network 16, with the result that this half cycle is prevented from applying a potential to the right grid. However, since capacitor 31 was charged in the positive half cycle to a negative potential, it will discharge through resistor 28 during the negative half cycle, thereby maintaining a negative potential at the right grid of tube 25, and maintaining the non-conductivity of the right half of tube 25, thereby to maintain relay IND1 in the unoperated position. Thus, so long as modulated light falls upon devices 3 of the light index channels IND1 and IND2, which occurs when all the cards 1 are in the stack and none of them is displaced, relays IND1 and IND2 will be normal, thereby maintaining relay RD (Fig. 2) in the non-operated position and the channel output circuits ineffective, notwithstanding the fact that modulated light will illuminate the respective devices 3 of the latter circuits.

Referring particularly to Figs. 5, 6, 7, 8, 11 and 13, the cards 1 comprising the stack normally rest with their tabs 21 and the two end tabs CS upon a series of forty parallel bars arranged in two groups of twenty on each side of the lower guide slot and underneath the tabs. The two end bars 32, known as the card support bars, are located directly under the two support tabs CS, while the remaining bars 33, known as the code bars, are located directly under the remaining thirty-eight tab positions. When the translator is normal, each card 1 in the stack rests with its two end support tabs CS on the two end bars 32 and with its unremoved tabs 21 on those code bars 33 which are located directly underneath said tabs, as partially indicated in Fig. 11. All of the bars, when normal, are in horizontal alignment. The two end card support bars 32 are each provided with a central rectangular slot 43 in which loosely fits an extension of the armature of a card support magnet 42 of which one is provided for each of the two card support bars 32. Each of said card support magnets 42 is secured by suitable mountings in a pocket formed on each side of the frame 61 of the apparatus, the armature extension of the magnet fitting into the rectangular opening of the bar in such a manner that when the bar is normally resting on its up-stop the extension may engage either the top or bottom surface of the rectangular opening. When, however, the magnet is energized, the extension is tilted upward until it engages the top surface of the rectangular opening, but without moving the bar, holding the latter firmly against its up-stop for a purpose that will be presently discussed.

Figure 7:
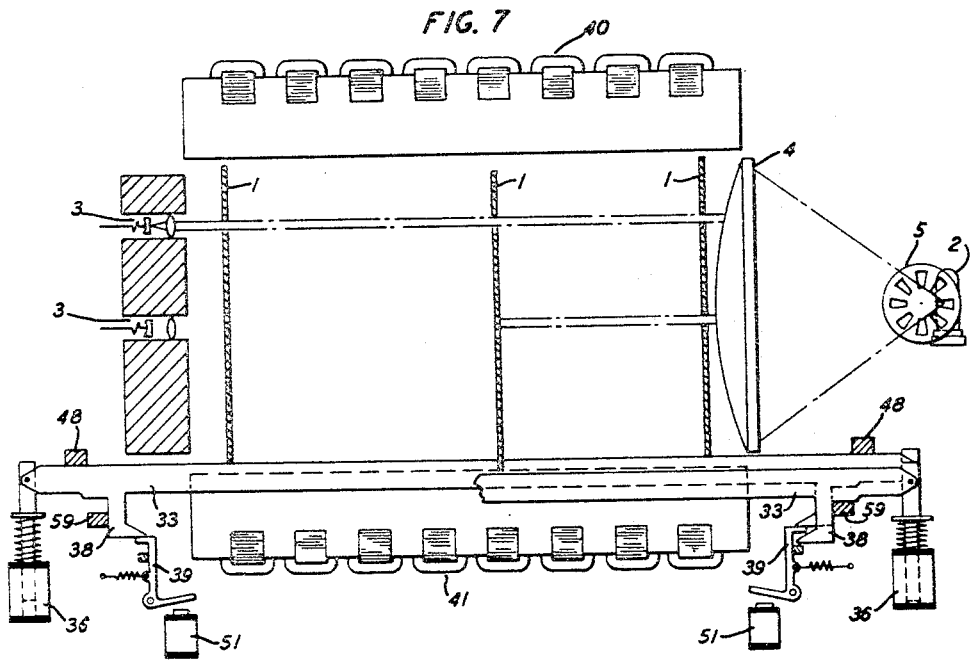
Fig. 7 is a schematic front elevation showing the main parts of the apparatus utilized for the selection of a card in the stack and the restoration of the card.

As will be shown later, when a card 1 is to be selected or displaced in the stack, all of the cards are lifted off the support bars 32 and the code bars 33 by the energization of the pull-up magnets 40 and the pull-down magnets 41 which are located, respectively, above and below the cards, as indicated in Figs. 7, 13 and 25. Simultaneously with the energization of the pull-up and pull-down magnets 40 and 41 the card support magnets 42 are energized to hold the card support bars 32 against any downward movement, as above stated. If for any reason some of the cards have not been lifted off the code bars 33 and card support bars 32 by the energization of the pull-up and pull-down magnets 40 and 41 said cards will then be supported by the card support bars 32, said bars being held against any movement by the energization of the two card support magnets 42. After the card support magnets 42 are energized (and with the cards 1 lifted off the code bars 32 and the card support bars 33, as previously stated) those code bars 33 which correspond in position to the tabs 21 of the card to be selected are pulled down by the energization of their associated pairs of solenoids 36, two of which are located at the end of and coupled to each code bar 32, the distance by which the bars 32 are pulled down corresponding to the length of the tabs 21. When the code bars 33 corresponding to the code of the card to be displaced in the stack have been pulled down by the action of their associated solenoids 36, the card support magnets 42 are released and the pair of solenoids 36 provided for each of the two card support bars 32 are energized, causing said bars to be drawn down into alignment with those code bars 33 which have been operated. Deenergizing the pull-up magnet 40 will then cause the uplifted cards to fall by gravity, aided by the magnetomotive force supplied by the still energized pull-down magnet 41, upon the code bars 33. However, since only those code bars 33 have been pulled down which are underneath the tabs 21 of the one card to be selected, it follows that while the other cards will come to rest with their tabs 21 selectively upon the unoperated code bars, the one selected card will continue to fall in the stack until it comes to rest upon the surface of pole-shoes 62 of the pull-down magnet 41. The selected card will then assume the position indicated in Fig. 5, which shows, fragmentarily, the selected card resting with its tabs 21 upon the lowered code bars 33, with its outer tabs CS upon the lowered card support bars 32, and in engagement with the pole faces of the pull-down magnet 41, the position of a selected card in relation to an unselected card being more clearly illustrated in the perspective view shown in Fig. 6 and in schematic side view of Fig. 7, the latter figure showing but three cards of the stack, the middle card being the selected card.

Figure 8:
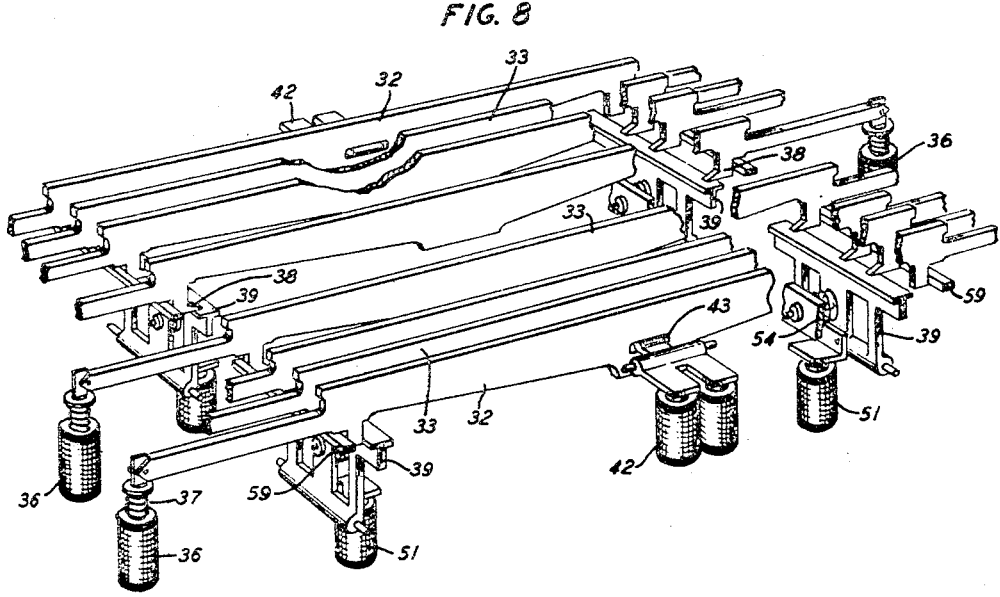
Fig. 8 is a perspective view showing the relation between the code bars, latch mechanisms and card support bars and magnets, the bars and portions of the latch mechanisms being cut away for clearness.
Figure 10:
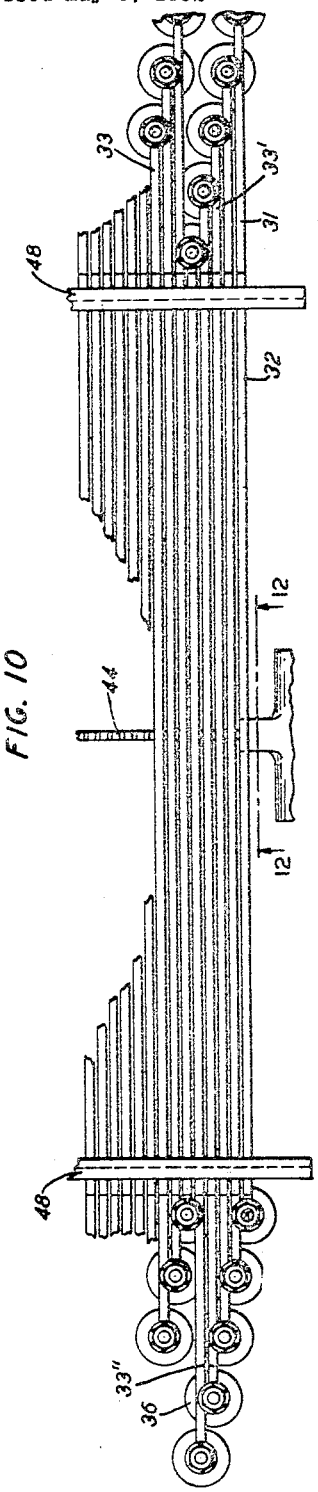
Fig. 10 shows a plan view of Fig. 9.
Figure 9:
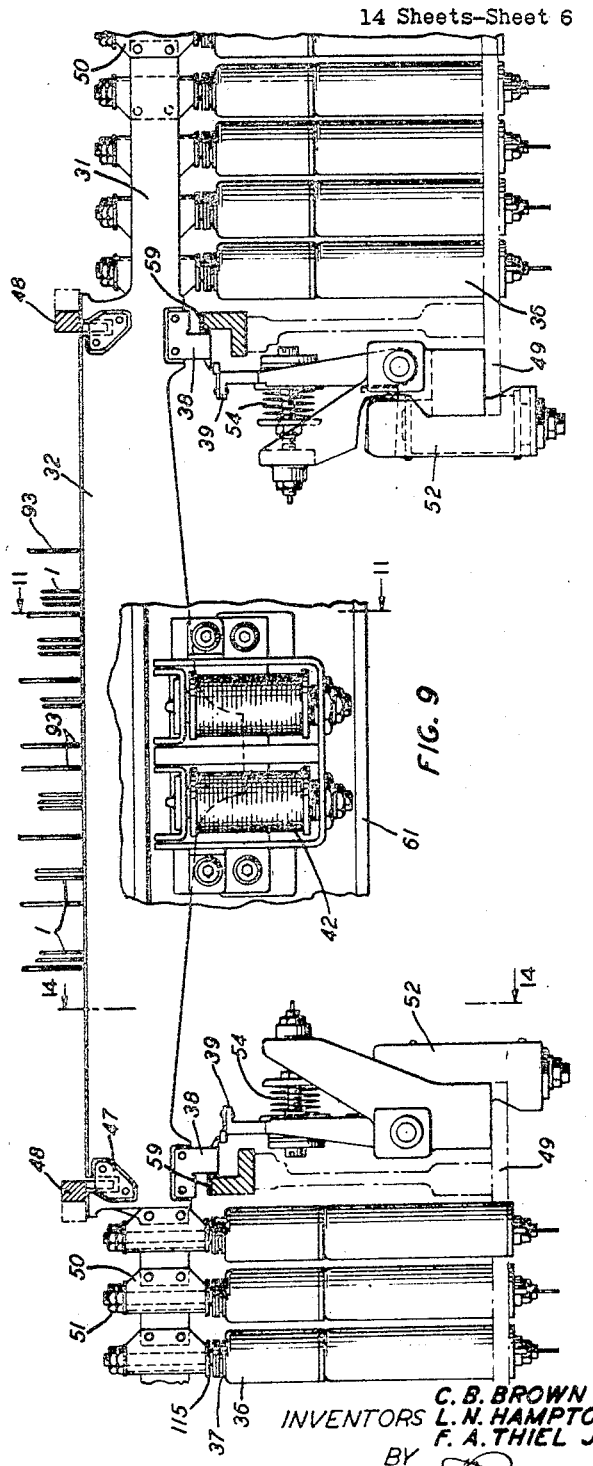
Fig. 9 shows a front elevation of the code bars with their operating solenoids, two of the latch magnet assemblies and one of the card support magnets.

The code bars 33 as well as the card support bars 32 are made of suitable light material, preferably stable heat treated magnesium alloy; they should be relatively thin, recessed to reduce weight, but with a deep vertical central section to provide rigidity in the direction of loading and, in general, have the shape indicated in Figs. 8 and 9. The surface of all bars should be machined to provide the required order of straightness and should be bonded to some suitable impact-resisting material, such as nylon, for example, to reduce wear both on the cards and on the bars, and to reduce bounce when the cards descend upon the bars. The length of all bars is the same, but owing to the staggered location of the solenoids 36 in the housing of the apparatus (as shown in Figs. 9 and 10) the projection of the bars at assembly to the left and right of the center line differs. In one case, the projection is the same, as for instance, the bar 33' in Fig. 10. In another, the projection to the left is a little greater than the projection to the right, as in the case of bar 33" in said figure. In the third case the difference is more pronounced. This accounts for three of the five mounting conditions. The other two (greater right-hand projection) are accounted for by reversing the bars of unequal projection. Thus it is obvious from the above that the bars are mounted in staggered array in order to mount them in close centers, a desirable arrangement because the space of the bars controls the length of the cards, and the length of the cards should be as small as practicable.

For a reason that will be explained later, each of the code bars 33 is provided with two inwardly disposed feet 38 (see Figs. 8 and 9) which are either an integral part of the bar or separately formed plates of the same or other suitable material, which are secured in any suitable manner to the bar in the positions indicated in Fig. 9. As shown more in detail in Fig. 15, each foot 38 comprises a toe portion that comes to a triangular point, and a shortened heel portion. Each of the card support bars 32 is also provided with a pair of inwardly disposed feet similarly located as those of the code bars 33. In the case of the latter bars, however, and for a reason that will shortly appear, the feet 38 for said bars do not have triangular toe points, the points in the feet 38 shown in Fig. 9 being those on the feet of the code bar 33 immediately behind the illustrated card support bar 32.

The code bars 33 and the support bars 32 are positioned and guided laterally at the ends near their top edges and at the center near their bottom edges by comb guide elements, a pair of top guide elements and one lower guide element being provided for each group of twenty bars and transversely secured with respect thereto. The top guide elements 48 (see Figs. 9, 10, 15 and 16) which also serve as up-stops for the code bars 33 and support bars 32, limit the upper movement of said bars and define their aligned normal position, the bars being engaged near their ends. The guide elements 48 are step cross-sectioned, and are so mounted as to provide a downwardly projecting wall, slotted to engage certain plates affixed to the bars as explained below. The step surface acts as the up-stop for the code bars 33 and the support bars 32. It should be noted that the up-stops 48 of the translator are located inside of the solenoids 36 that operate the bars, as shown in Fig. 9. If desired, and by an obvious and slight change of design, the up-stops may be located outside of the solenoids instead of inside.

The lower code bar and support bar guide comb element 44 (see Figs. 11 and 10) is similar to the upper guide elements 48 except that it is a plain slotted bar and not stepped like the up-stop element 48. One lower guide element 44 is provided for each group of twenty bars (including one card support bar 32), one being mounted on each side of the pull-down magnets 41 along the center line of the apparatus, the guide element for the left group of bars, as viewed from Fig. 11, being shown in said figure. Each comb guide element 44 is mounted upon a support 45, secured by screw 116 to the involved side of the frame of the apparatus and in the center thereof.

It will be noted from Fig. 11 and also from Fig. 16 that the clearance between bars is very small, and that if the bottom comb element 44 had teeth sufficiently wide apart to accommodate the width of the bars for free movement between teeth, the latter would be of small cross-sectional area and broken or rapidly worn down during the operation of the machine. To provide sturdier teeth and a better wearing surface between them and the bar portion that moves between the teeth, each bar, including the support bars 32, is formed with a pocket at the center bottom (see Fig. 12) in which is mounted by any suitable means an engaging plate of a material having a low coefficient of friction, such as graphetized phenolic linen, for example, and sufficiently thin to move freely in the space between more closely spaced and stronger teeth. Similar comb guide engaging plates 47 (see Fig. 9) are secured in triangular pockets formed near both ends of each bar close to the top, and pass freely in the space between the guides of the upper combs 48.

As previously mentioned, the code bars 33 and the support bars 32 are operated by solenoids 36, two of which are provided for each bar, one at each end thereof. These solenoids may be of any suitable construction. In one preferred form the plunger of the solenoid is made of magnetic iron, fashioned to form a conical crater (not shown) at its inner end and the lip thereof provided with a substantial dimension. As will be understood, the crater constitutes the pole face area which, of course, functions with the truncated cone end (not shown) of the fixed core. Cone and crater construction is preferable where the operating stroke of the solenoid is comparatively large, the cone and crater providing better operating characteristics than would be obtained with square end construction, the design being such that with the retractile spring 37 (see Figs. 8 and 9) in position under the retaining spring washer 115 the operate limit of the plunger will provide a small gap between the cone of the core and the crater of the plunger. The external end of the plunger is slotted and a hardened steel blade is brazed in this slot. The main body of the blade is rectangular in form, but its external end is turned back and threaded to hold said washer, also brazed in position against the end of the plunger. The end of the plunger is ground to a slight taper which is blended into the cylindrical portion of the plunger. The object of the taper is to prevent gouging in the event the work core assembly is canted during operation to the extent permitted by the working clearance. A shock absorbing detail is bonded to the outer surface of the retractile spring washer 37.

As shown in Fig. 9, the solenoids 36 (of which eighty are required for a translator equipped with thirty-eight code bars 33 and two support bars 32) are mounted in aligned pairs on two fixed and oppositely aligned supporting plates 49 secured to the walls (not shown) of the apparatus. If desired, the construction may be slightly changed so that the solenoids may be yieldably mounted so that the impact forces that would be developed by a bottoming plunger could be maintained within closer limits, by providing a smaller gap between the cone of the core and the crater of the plunger. Each code bar 33 or support bar 32 is connected to its own pair of solenoids by the coupling collars 50 which are fitted to the plunger members of the solenoids and secured to the bar, each collar being held in place on the plunger by washer 115, an upper washer mounted over the collar 50, and a nut 51 threaded to the plunger above said last-mentioned washer. The nut is adjusted to permit of some play so as to prevent binding at either end of the bar in the event that the two solenoids, upon operation or release, do not move their respective plungers in exactly the same time.

Between the lower washer and a boss (not shown) at the end of the magnetic spoolhead of each solenoid, is placed the retractile spring 37, which serves to restore the plunger and move the bar against the up-stops 48 when the solenoid is released. As previously stated, when a pair of solenoids is operated, the plungers are pulled down, lowering the bar to its operated position. When the bar is lowered, the retractile spring 37 on each of the pair of solenoids is compressed. When the solenoids are deenergized the springs 37 serve to restore the bar against the up-stops 48 by pushing upward the plungers and the bar collared thereto.

Mention has been made of the fact that the card stack normally rests upon the code bars 33 and the support bars 32. Since the bars are supported by the springs 37 coiled around the solenoid plungers, the weight of the cards would, in fact, rest upon the springs. This arrangement, however, while suitable and within the scope of the present invention, involves the use of very stout springs where the weight of the cards is heavy, in which event the retraction of the springs would require more power from heavier solenoids whose dimensions would have to be larger for the purpose and entail more spacious housing. Therefore where space is limited and current economy is desirable, an alternative and preferred arrangement within the scope of the present invention is the provision of certain latching devices that lock the code bars 33 against any downward motion and take upon themselves the weight of the cards, thus relieving the solenoid springs of this weight and enabling the use of lighter springs and smaller solenoids. These latching devices are schematically indicated in simplified form in the side view of Fig. 7 and in the perspective view of Fig. 8, with the details thereof further illustrated in Figs. 9, 14 and 15.

Referring particularly to the above figures, the latching mechanism comprises four similar latching units each consisting of a latch member 39 and a latch magnet 51 for operating the member. Two latch units are used for one group of nineteen code bars 33 and the other two units are used for the second group, the two latch units for each group of bars being disposed on opposite ends of the bar group they serve. The magnets 51 of a pair of latch units for one group of bars are mounted on the opposite solenoid mounting plates 49, the latch member 39 of each unit being journaled on a bearing 52 in the vertical mounting support 53 bolted to the plate 49 and having an inclined upper portion. The L-shaped armature of magnet 51 is secured by an end thereof to the member 39 by a screw or other suitable means, so that when the magnet is energized the member 39 will move towards the magnet (to the right as viewed in Fig. 15, and to the left for the latch unit on the forward extreme right in Fig. 8). To provide for the return of the latch member 39 upon the deenergization of the magnet, a retractile spring 54 is lodged between the member and the dish-shaped washer 55 mounted upon the screw 56 threaded through the inclined portion of the member 53 and passing through the bushing 57 supported in an aperture in the latch member 39. The purpose of the screw 56, the turning of which moves the latch member 39 inwardly or outwardly, is to adjust the position of the member in respect to the feet 38 of the code bars, while the purpose of the dish-shaped washer 55 is to adjust tension on the spring 54.

As previously stated, each of the code bars 33 is provided with the oppositely disposed feet 38 at the ends thereof, as indicated in Figs. 7 and 8, and fully shown in Figs. 9 and 15. When members 39 of the latch units are normal, that is, with their magnets 51 unenergized, and the code bars are in the unmoved position, said latch members are each so adjusted by the screw 56 that the toe of foot 38 of each code bar rests upon the ledge of the latch member, as particularly shown in Fig. 15. Thus in the normal condition, the code bars 33 are not held in position by the two springs 37 of their respective solenoids 36, but by the latch members 39 upon which said bars rest with the toes of their feet 38. Since the cards 1 normally bear upon the code bar 33, it is apparent that by the use of the latch members 39, the weight of the cards 1 is not supported by code bars 33 or by the springs 37 secured to the code bars, but by the latch members 39, said latter members obviously precluding any downward movement of the bars so long as a seat for the feet 38 of the bars is provided by the ledge of the latch members 39 in their normal position.

Each latch member 39 is also so adjusted by the screw 56 that when the latch magnet 51 is operated and the member 39 moves towards the magnet, clearance is provided between the end of the toe of the foot 38 and the edge of the latch. In this operated position of the latches, the code bars are no longer supported by the latches but by the solenoid springs 37. However, when the translator is provided with latches as shown, the circuitry of the translator is so arranged, as will be described, that prior to the operation of the latch magnets 51, the cards 1 will have been lifted off the bars by the energization of the pull-up magnet 40, leaving the springs 37 to support only the weight of the bars themselves, it having been stated that whatever cards have not been pulled up will be supported by the two card support bars 33. With the toes of the feet 38 clearing the end of the latches, the energization of the two solenoids 36 of a bar will cause the bar to be pulled downwardly until the heels of the feet 38 of the bar come to rest upon the two down-stops 59, which are two L-shaped members for each group of nineteen bars secured in horizontal alignment at opposite ends of the bars directly underneath the heel portions of the feet 38. As in the case of the surface of the code bars 33 upon which the cards 1 rest, the surfaces of the down-stops 59 should likewise be bonded with some impact-resisting material, such as nylon for instance, in order to reduce wear of the heel portions of the feet 38 and in order to reduce bounce when a code bar is pulled down by its energized solenoids.

It has been stated that in the operated condition of the latches 39 there is clearance between the toes of the feet 38 and the ledges of the latches, so that when a bar 33 is pulled downward by the energization of its pair of solenoids 36, the toes will not engage the ledges during the movement of the bar. It is apparent that if, while the bar is in its downward position, the latches 39 are released by the deenergization of the latch magnets 51, the ledges of the latches will be over the tops of the toes, preventing the bar from being restored to normal by the action of the springs 37 upon the release of its solenoids, since the toes will catch the underpart of the ledges and hold the bar "locked" in its operated position notwithstanding the deenergization of its solenoids 36. It is further apparent from the above that if the latches 39 are released while some of the bars 33 are down and some of them are up, all of the bars will be locked in the particular position they happen to be at the time that the latches are released since, in releasing, the upper surface of the latch ledges will move into position under the feet 38 of the unoperated bars to support said bars against any downward movement, and the under surface of the latch ledges will move into position over the toes of the feet 38 of the operated bars to prevent said bars from moving upward. By means of this arrangement it is evident that by operating the latch members prior to the selective operation of the code bars and then releasing them subsequent to such operation, said latches will provide support for the weight of the cards at all times, and especially after the selection of a card when it is especially desirable, since at that time all of the cards but the selected card will be resting on less than all the bars.

When the translator is equipped with latches such as those above described, for example, its operation differs slightly from what has already been indicated. For, since the code bars 33 normally rest upon the latch members 39, blocking any downward movement of the bars, it is essential that after the cards 1 have been lifted off the code bars 33 by the energization of the pull-up magnet 40 and the pull-down magnet 41, and before the solenoids 36 of the bars to be pulled down are energized, said latch members must be drawn away from under the feet 38 of all the code bars. Therefore, prior to the energization of the solenoids 36 of the bars 33 which are to be pulled down for the selection of a card, the four latch magnets 51 are energized, thereby drawing their respective latch members 39 away from under the feet 38 of all code bars, and causing said bars then to be supported solely by the springs 37 of their respective solenoids 36. With the four latch magnets 51 operated and the latch members 39 consequently removed from under the feet 38 of the code bars 33, a group of contacts 60 (shown in Fig. 25) for each latch unit and actuated by a latch magnet 51 is closed to establish circuits (as will be described) signaling that all four latches 39 have been withdrawn from under the toes of the feet 38 of all code bars, whereupon the solenoids 36 for those code bars 33 which are to be pulled down to select a wanted card are energized, along with the solenoids 36 of the two card support bars 32.

During the time that the latch members 39 are operated, and the operated code bars 33 are thereafter pulled down against the down-stop 59, the unoperated code bars are being supported by the springs 37 of their respective pairs of unenergized solenoids 36, which is satisfactory since the pull-up and pull-down magnets 40 and 41 respectively, being still energized, the cards are off the bars. Now, each bar 33 controls a pair of contacts (not shown except in the circuit drawing of Fig. 26) which are closed when the bar is operated, and a circuit established by the contacts of all the operated code bars operates a relay which opens the circuit of all four latch magnets 52, thereby releasing said latch magnets to return the latch members 39 to their original position, bringing their ledges under the toes of the feet 38 of the unoperated bars 33 and over the toes of the feet 38 of the operated bars 33. The bars are all locked in their unoperated or operated positions and thereby cause the weight of the cards, when said cards are released for descent from their uplifted position, to fall upon the bars 33 and be supported by the latch members 39 instead of the bars 33, all as before described. Thus by the use of the latches of the kind above described and operating the translator in the order indicated, the cards, while resting upon the code bars, will have their weight supported by the latches, an arrangement that makes it possible to use lighter rectractile springs 37 on the solenoids 36, less powerful solenoids and, of course, less power in operating said solenoids.

Figure 5:
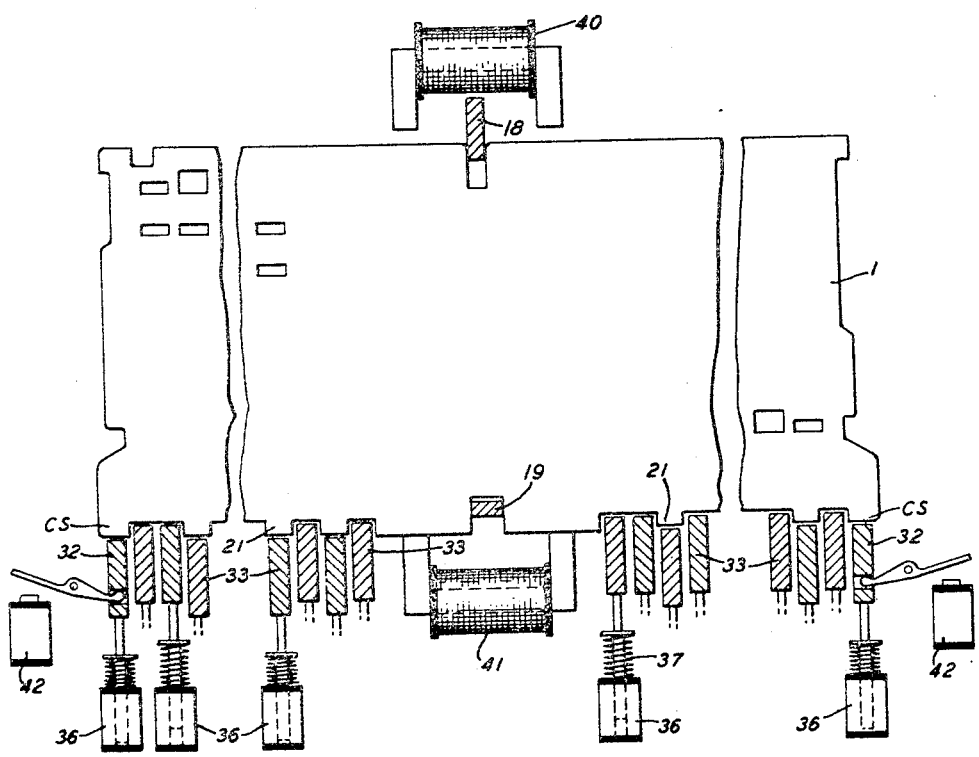
Fig. 5 is a fragmentary schematic showing of the relation between a card, the selecting code bars, the card support bars, and the pull-up and pull-down magnets.

As previously stated, the translator is provided with a pull-up magnet 40 and a pull-down magnet 41, the former being positioned centrally over the cards 1 and the latter positioned centrally under the cards, as indicated in Figs. 5, 7, 11 (pull-down magnet only shown), 13 and 25. The pull-down magnet 41 comprises a number of coils (eight in the preferred example as illustrated) which are disposed between the two groups of bars 33 underneath the card stack, with the cores thereof magnetically secured to the inverted L-shaped pole-pieces 62 by screws (not shown) or other suitable means. The pole faces of the pole-pieces 62 are bonded with an impact-resisting material, such as nylon strips for example, and are located slightly above the top surface of the code bars 33 when the latter are in their down-stop position. Therefore, the pole faces provide the stop surface for selected cards, as indicated in Fig. 13. The ends of the pole-pieces 62 are fitted with shoe-end plates 63 of magnetic iron which project substantially above the pole faces and serve to conduct flux to the end partitions 93 of the card bin (shortly to be described) thereby to insure that the cards adjacent to the end partitions will be rapidly elevated when the card stack is lifted by the action of the pull-up magnet 40. The pole-shoe assembly is secured by screws to frames (not shown) forming a part of or connected to the housing walls of the apparatus.

The pull-up magnet 40 comprises a row of coils (eight in the preferred example as illustrated), two pole-pieces 64 to which the cores of the coils are transversely secured, and the two end brackets 65' (of which one is shown in Fig. 13) positioned intermediate the pole-shoes 64 beyond the first and eighth coil which serve to tie the magnetic structure together. The working (lower) edges of the pole-pieces 64 are fitted with the details 65 (see Fig. 13) a portion of each of which is faced with antifreeze strips made of any suitable impact-resisting material, such as nylon, to reduce the rate of wear both on the pole faces and the abutting edges of the cards. The pole-pieces 64 together with the pull-up magnet coils 40 between them are secured to the sides of the two lift brackets 66 (see Fig. 25).

Lodged along the center line of the pull-up coils 40 between two guide pieces (not shown) secured to each end of the pole-shoes 64, and pinned at each end to a lift pin 87 is the upper guide bar 18 (see Figs. 17 and 25). Each pin 87 (of which the forward one only is shown in Fig. 25) is adapted to move within an aperture in the fixed cross-piece 88 below which and the pinning point is held captive the retractile spring 89. To the top end of each pin 87 there is a roller 77 which is adapted to engage the inner flange of the half-cam 76. It is apparent that when the cams 76 are rotated to engage the rollers the pins 87 are moved upwardly to cause the guide bar 18 to withdraw from the groove formed by the upper notches in each of the cards 1 of the stack, and that when the cams are rotated in the opposite direction they permit the pins to move downward under the action of the springs 89 to again cause bar 18 to enter the groove formed by the notches in the cards. The permissive action in lowering the bar 18 under the action of the springs 89 is to preclude damage to the cards or any of them if the bar were to be forced into the groove.

Before proceeding with a consideration of the remainder of the pull-up magnet structure it will be stated that the cards 1 comprising the stack are housed in a card bin located between the pull-up magnet 40 and the pull-down magnet 41. This bin comprises a suitable number of compartments formed by the partition plates 93 (see Fig. 25) fastened together by means of four longitudinally disposed members (of which the member 67 only is shown in Fig. 25) secured to the apparatus housing. The partitions are made of magnetic material and each is perforated to provide apertures which are in alignment with the holes in the cards. The apertures are round and of sufficient diameter to provide a substantial margin beyond the confines of the card holes. Each partition, like each card 1, is provided with a lower central slot. The lower card guide bar 19 is fixed to a rectangular supporting member (not shown) fastened to the outer surface of the two end partitions of the card bin, and also to one of the centrally disposed partitions. The three positions of mounting the lower guide bar should preferably be in accurate alignment.

Mention has been made of the fact that the shoe plates 63 of the pull-down magnet pole assembly extend above the surface of the pull-down pole-faces 62. The ends of the plates 63 are in vertical alignment with and close to the lower edge of the end partitions of the bin, and serve to conduct the flux from the ends of the magnet poles through said end partitions rather than the cards close thereto. By this arrangement practically no flux passes through said cards when the pull-down magnet is energized, thus aiding said card in being lifted when the pull-up magnet is energized.

The cards 1 in the several compartments of the card bin are disposed therein by mounting them with their bottom guide notch riding the fixed lower guide bar 19, and with their upper guide notch fitted into movable upper guide bar 18. At this point, and referring particularly to Fig. 25, the cards of the stack are normally in position distributed at random in the different partitions of the card bin except that two of the central partitions are close together and the space therebetween unoccupied by cards to avoid interference of the cards with the bracket 90 centrally supporting the upper guide bar 19.

Depending upon the number of cards in each partition, said cards, if there are too few in a partition, will have a tendency to lean upon each other, and if there are too many, the sliding friction between them will be excessive. Assuming that there are just enough cards in all the partitions to avoid crowding, the cards will nevertheless have a tendency to lean. This leaning is corrected as part of the card selection operation by subjecting all the cards in the stack simultaneously to the force of two magnetic fields (see Fig. 13), the one produced by the energized pull-up magnet 40, and the other by the energized pull-down magnet 41. These two fields "straighten" the cards, causing them to assume a perpendicular position with a certain amount of clearance between them. Owing to the fact that the air-gap between the bottom edge of the cards and the pole faces 62 of the pull-down magnet 41 when the cards are resting on the unoperated code bars 33 and card support bars 32 is much larger than the air-gap between the pole faces 65 of the pull-up magnet 40 (including the upper guide bar 18), the pull-up force is so much greater than the pull-down force that all the cards are lifted into engagement with the pole faces 65 of the pull-up magnet 40, and are then held by the magnetic attraction produced by the energized pull-up magnet until the latter is deenergized after the code bars 33 have been selectively pulled down, the card support bars 32 have also been pulled down, and the code bars 33 have been locked by the latches 39 either in their normal condition or operated condition as the case may be, at which time the cards are released to fall by gravity upon the code bars 33, aided by the magnetomotive force of the energized pull-down magnet 41 with the card having the tabs 21 corresponding to the operated code bars 33 descending below the level of the normal code bars to come to rest upon the pole faces 62 of the pull-down magnet 41.

As previously mentioned, the cards 1 are maintained in the card bin between two guide bars, a lower fixed guide bar 19 and an upper movable guide bar 18. In order to insert or remove cards from the bin it is necessary to raise both the pull-up magnet structure and the upper guide bar 18 until they are elevated above the top edge of the cards by a distance sufficient to permit disengagement of the card with lower guide bar. When the upper guide bar 18 is so elevated, any card may then be removed from the stack by lifting it vertically in the stack until it clears the upper surface of the lower guide bar 19, and drawing the card out of the stack.

It is evident from the above that in order to insert or remove cards from the stack, the pull-up magnet structure must be elevated. The mechanism by which this elevation is accomplished for the above and other purposes is generally shown in Fig. 25, with certain of the details thereof more particularly illustrated in Figs. 17 to 24, inclusive.

Referring to Figs. 17 to 25, inclusive, the pull-up magnet mechanism comprises two shaft brackets 70 each topped by a cylindrical guide pin 69, each of said shafts having an aperture therein for the support of the lift shaft 71. The brackets 70 are secured to the frame 67 with the holes thereof in opposite and horizontal alignment. The pull-up magnet 40 with the pole-pieces 64 are secured to and between the lower part of the outer flanges of two triangular lift brackets 66 which are disposed with their flanges facing inwardly, each lift bracket 66 being disposed in back of the associated shaft bracket 70. When in the normal position and the pull-up magnet structure is elevated in the manner to be described, the lift brackets 66 have apertures sufficiently large to provide clearance of the lift shaft 71 and its supporting bearings.

The brackets 66 upon which are mounted the lift rollers 73 are provided with angular extensions 68. These are machined to provide slide bearings adapted to guide the pull-up magnet structure over the pins 69 when the structure is being raised and lowered in the manner to be described. The right-hand bracket is slotted and the left-hand bracket is bored to provide for transverse and longitudinal guidance of the pull-up magnet structure during vertical displacement and, also, due to the longitudinal slotting at one end, to permit of differential expansion and contraction of the assembly without binding. It is evident from Fig. 17 that since the pull-up magnet assembly is secured to and between the two lift brackets 66, and since said brackets are supported for vertical movement on guide pins 69 by the angular brackets 68, the pull-up magnet assembly can be lifted vertically with the guide pins 69 as bearings.

The means for effecting such elevation is provided by certain cams and rollers which are brought into action by the lift shaft 71 which is journaled in bushings provided by the aligned apertures in the brackets 70. By means of the cross gears 83 of which one is mounted at the right end of the lift shaft 71 and the other on the perpendicularly disposed crank shaft 84 to which the crank 85 is coupled, motion can be imparted to lift shaft 71 by turning the crank, which motion is availed of to lift or lower the pull-up magnet structure.

Within the central channel of each of the lift brackets 66 is fitted a U-shaped depressor bracket 75 and shouldered depressor pin 74 that is journaled in the legs of the bracket 75, and by radial disposition makes captive a comparatively strong compression spring 86. The function of the pins 74 will be shortly explained in connection with operations resulting from the turning of the lift shaft 71.

Mounted on the lift shaft 71 are six cams. One pair of these cams is the lift cams 72 which are mounted suitably for alternately engaging the lift rollers 73 and the depressor pins 74. The second pair of cams 76 controls the lift of the upper card guide bar 18, and these cams are mounted on the lift shaft 71 suitably for engaging the upper card guide lift rollers 77, mounted near the top of the upper card guide lift pins 87 as previously explained. The two other cams do not function in pairs. The crank-lock control cam 79 controls the closure contacts CLC which may be used in connection with the circuit of the crank-lock release magnet 80 in order to energize the latter and permit the lifting of the pull-up magnet structure, as will be explained. The remaining cam 81 is crank-lock normal switch cam controlling a pair of contacts CON which are closed when the pull-up magnet structure is off-normal; that is, at any elevation above its normal position; and may be used to control any circuit device to indicate the fact.

The lift cams 72 are of the solid externally contoured type. They include both lift and hold down lobes, the latter lobes being adapted to engage the depressor pins 74. The lift lobes, under normal conditions, clear the lift rollers 73, but if the lift shaft 71 is revolved by turning the crank 85, the lift lobes engage the lift rollers 73, raising the lift brackets 66 and the apparatus secured thereto.

The upper guide bar lift cams 76 are of the partial contoured flange type, the inside surface of the flange portion constituting the working surface. Normally the flange portion is clear of the upper card guide lift rollers 77. Actually the cams are inactive over the full range of activity of the associated lift cams 72. However, the latter cams also have an inactive range, and it is over this range that the cams 76 are active, becoming so by virtue of their flange passing under the rollers 77 and engaging them as rotation continues, lifting the pins 87 and the guide bar 18 secured to the pins until, by the full rotation through the flange, the bar is lifted above the lower edges of pole-shoes 65 of the pull-up magnet structure in its elevated position.

Bridging the poles-shoes 64 of the pull-up magnet near its longitudinal center line is a brass bracket 90. As shown in Fig. 21, a lower appendage of this bracket is slotted and serves as a center slide bearing for the bar 18, and to this extent is supplementary to the end brackets above referred to but not shown, which serve as slide bearings for said bar. The center of the bracket 90 is bored to accommodate the plunger rod 91 that follows the bar 18, and actuates a suitable alarm 92 when the bar, in its downward movement, has not entered the slot in the card stack formed by the upper guide notches in the cards. In this connection it will be noted that the portion of the bracket 90 which engages the bar 18 projects below the pole faces 64. Interference with the card stack is avoided by positioning the bracket so that the projection lies between two closely spaced centrally disposed partitions 93 of the card bin between which no cards are contained, as previously explained. Failure of the bar 18 to enter the card stack when the bar 18 is being lowered may be the result of friction caused by minor displacement of the cards. In such an event, the pull-up magnet 40 may be rapidly energized and deenergized to agitate the cards until the bar is seated within the stack notch.

In view of the above, it is evident that if clockwise rotation is imparted to the lift shaft 71 by turning the crank 85, the pull-up magnet structure secured to the lift brackets 66 as well as the brackets themselves will be lifted by the rollers 73 a distance determined by the crest of the lift cams 72 engaged by said rollers. When this travel is completed, the cams 76 come into action, and with further rotation, the guide bar 18 is lifted out of the card stack slot. Conversely, imparting counter-clockwise rotation to the lift shaft 71 (after the guide bar 18 has been lifted) produces the reverse movement, the cams 76 first lowering the guide bar 18 into the card stack notch and the cams 72 then subsequently lowering the structure supported between the two lift brackets 66 as well as the brackets themselves. At the end of the downward movement the lobes in the cams 72 will be shouldered upon the depressor pins 74 which, by means of the spring 86, push up against the lobe, thus tending to hold the pull-up magnet structure in position against the impact of the cards where they are pulled up against the pole faces 65 by the energization of the pull-up magnet 40.

The lift shaft 71 is normally locked against rotation by the crank lock cam 94 mounted on the crank shaft 84, and by the crank-lock pawl 95 integral with the armature of the lock release magnet 80 engaging a two-way locking notch on the cam. As shown particularly in Fig. 22, the cam is of the externally contoured type with a stop protuberance 96 in the rear of the notch, the right side of the cam (as viewed in Fig. 22) providing a riding surface for the pawl up to the stop 97 in the opposite side of the cam. During the time that the cam 94 is rotated to the stop 97 the pull-up magnet structure will be raised its full limit on the lift pins 69 by the lift rollers 73. During the time that the cam is then rotated from the stop 97 to the left edge of the protuberance 96, the upper guide bar is raised the full limit of its travel. The left edge of the protuberance 96 marks the limit of the total travel, and even if the magnet 80 should be energized at the time that the pawl 95 engages this left edge, the pawl, though raised by the action of the magnet, will abut against the edge of the protuberance and prevent further rotation of the lift shaft 71. The bracket 15, mounted parallel to the pawl 95 and having a locking notch coincident therewith, is furnished to provide additional strength.

Assuming, then, that the lock release magnet 80 is deenergized and the pawl 95 is engaging the two-way locking notch in the cam 94, any effort to turn the crank 85 will be unavailing since it is stopped by the pawl resting in the notch. To impart turning movement to the crank 85, and therefore to the lift shaft 71 through the cross gears 83, it is necessary first to energize the magnet 80 and thereby lift the pawl 95 out of the notch, whereupon any turning movement imparted to the crank 85 will be transmitted to the lift shaft 71, which functions in the manner described to lift the pull-up magnet structure. If the magnet 80 remains energized until the cam 94 is rotated to bring the stop 97 into coincidence with the pawl, further rotation of the crank 85 will be transmitted to the lift shaft 71 since the stop 97 will clear the pawl 95 in its operated position, thus to cause the guide bar 18 to be raised. However, if the magnet 80 is deenergized and the pawl is released after clearing the two-way locking notch, no further lift action will take place after the cam reaches the stop 97; that is, after the pull-up magnet structure has been elevated to the height determined by the contours of the lift cams 72. If it is desired to raise the guide bar 18, the magnet must be reenergized to clear the pawl from the stop 97. In this case, however, if the magnet 80 is still energized when the pawl reaches the stop 97, the elevation of the guide bar 18 will nevertheless cease when the cam 94 is rotated to bring the left edge of the protuberance 96 into engagement with the pawl, since the height of the protuberance is greater than that of the pawl in its operated position. Thereafter the only motion available is a reverse motion that may be imparted to the crank 85, and therefore to the lift shaft 71, by which the guide bar 18 is first caused to descend into the card stack notch and the pull-up magnet structure thereafter caused to be lowered until the lift brackets 66 come to rest on the abutment studs 82, at which time the pawl 95 will again fall into the two-way locking notch in the cam 94.

It is sometimes desirable for inspection, maintenance and other reasons to raise the card stack without energizing the pull-up magnet 40. For this purpose two card lift bails 98 are provided which are pivotally mounted on each side of the two opposing lift brackets 66 (the forward bail shown in Fig. 25 being partially cut away to expose the card bin and cards 1 contained therein). Each bail 98 is normally held in an upper position by an adjustable spring 99 secured to the bail and to an anchor plate 100, the spring and plate for one bail being supported on one of the brackets 66 and the spring and plate for the second bail being supported on the oppositely disposed bracket 66, each spring being adjusted in such a way that the force line of the springs normally passes above the pivot centers. The proportions are such that if the bails are rotated so that their free ends approach each other, the force line passes to a position below the pivot centers before the lower or "work" position of the bails is assumed. In the "up" position each bail stop leg engages a "stop" boss 101 on the involved bracket 66. In the "work" position, shown in Fig. 19 by the broken line indication of the bails engaging the cards 1, each bail engages the card end notches. If there are no cards in the bin and the bails are lowered to their "work" position, each bail will engage as a stop an extension of the spring plate 100, as shown in Fig. 17. When the bails are in the "up" or unoperated position, contacts CL1, CL2, CL3, etc. are held normally closed or open depending upon circuits controlled therethrough. When the bails are in the "work" or operated position, the stop leg of each lifts a spring 102 which functions to close or open the contact pairs CL1, CL2, CL3, etc. As will be shown, the circuit for the pull-up magnet 40 is controlled through certain of these contacts to insure that the circuit of the magnet 40 is completed only if the bails 98 are in their lifted or unoperated position. Other contacts may suitably be controlled by the springs operated by the stop legs of the bails, such that when the bails are down or in the operated position, an alarm will be given to indicate the fact, or other circuits may be controlled thereby.

The proportioning of the bails 98 is such and the relationship of the pivot centers with respect to the work edges of the bails when the cards are engaged is such that an "ice tong" effect is produced. Accordingly, if the bails are swung into their card engaging position and the pull-up magnet structure is elevated in the manner previously described, the top surface of the bail work-strips will engage the top edge of the end notches in the cards. As the load is picked up, the engaging force, and hence the force that tends to draw the work-strips into the notches, will increase in proportion to the loading. Thus by means of the bails 98, when manually lowered into the work position to grip the card stack as indicated in Fig. 19, all the cards in the stack can be raised by turning the crank 85 which, in this case, has the effect not only of elevating the pull-up magnet in the manner previously described, but also of lifting the cards in the stack.

Reference will now be had to Fig. 26 which shows a typical control circuit for the translator, including various parts of the latter which are electrically operated from any equipment adapted to utilize the translator for obtaining certain output information in the form of a definite pattern of operated channel output circuits in response to certain input information effective to selectively operate the solenoids 36 of the various code bars. This equipment may be, for example, a decoder for controlling telephone switching connections as illustrated in the copending application of J. W. Gooderham et al., Serial No. 286,267, filed May 6, 1952, or any other control apparatus provided with suitable devices for transmitting input signals to the translator and receiving output signals from the translator. In view of the fact that the control apparatus forms no part of the present invention, said apparatus is referred to, in Fig. 26, simply as "control apparatus," to and from which certain conductors are indicated for operating the translator.

Moreover, the auxiliary circuits for operating the "light" motor 6 and the lock release magnet 80 under the control of the contacts CON and CLC, are not shown inasmuch as such circuits are simple and may be arranged in accordance with the use of the translator.

When the "control apparatus" obtains a connection to a translator, ground is applied to conductor PU. If the contacts CL1 on the bails 98 are closed, thereby indicating that the bails 98 are in their "up" position, a circuit is completed from ground on said conductor PU, over the No. 2 contacts of relay SCS2, or the No. 2 contacts of relay SCS1, contacts CL1, winding of relay PU to battery, causing said relay to operate. The ground on conductor PU also completes an operating circuit for relay CSL over the No. 2 normal contacts of relay CBK, winding of relay CSL, to battery. A ground is also applied to conductor CON, in consequence of which a circuit is completed for relay CON from said ground on conductor CON, No. 1 contacts of relay ARC, No. 9 contacts of relay CBK, winding of relay CON, to battery, causing the operation of the latter relay, which then completes an operating circuit for relay PD from battery over the No. 2 contacts of relay ARC, No. 2 contacts of relay CON, winding of relay PD to battery. With relays PU, PD and CSL operated, the pull-up magnet 40, the pull-down magnet 41 and the card support magnets 42 are energized, relay PU closing the circuit through the eight coils of the pull-up magnet 40 of which four only are indicated in Fig. 26, each coil of said pull-up magnet being in series with a slave relay PUS1 . . . PUS8, which operates in series with its associated pull-up coil to indicate the latter's energization; relay PD closing the circuit through the eight coils of the pull-down magnet 41 and their respective slave relays PDS1 . . . PDS8 (of which only four coils of the magnet 41 and only four slave relays therefor are indicated in the drawing), said slave relays performing the same function as the slave relays for the pull-up coils of the pull-up magnet 40, while relay CSL closes the circuit of the card support magnets 42.

As previously explained, the operation of the pull-up magnet 40 and the operation of the pull-down magnet 41 serve to separate the cards, lift them off the code bars 33, and cause them to be attracted to the pole faces 65 of the pull-up magnet 40, while the magnets 42 serve to hold rigid the support bars 32 and thereby support those cards which may have failed to be raised against the pole faces 65 of the pull-up magnet. If all the eight coils of the pull-up magnet 40 operate, then the eight slave relays PUS1 . . . PUS8 severally in series therewith are also operated as a check that no coil or its energizing circuit is open. Once, therefore, relays PUS1 . . . PUS8 have all operated, an awaiting ground on conductor LCH from the control apparatus completes an operating circuit for relay LCH over the No. 1 contacts of relay CBK, serially through the operated contacts of the relays PUS1 . . . PUS8, winding of relay LCH to battery. Relay LCH, in operating, completes the circuit of the four latch magnets 51, since, with cards held suspended against the pole faces 65 of the pull-up magnet 40 and those cards that may not be so suspended being supported by the bars 32, the code bars 33 may be unlocked for operation, said bars, it will be recalled, being held locked against downward movement by the latch elements 39, controlled by the latch magnets 51, being in their normal position. As previously pointed out, each latch magnet 51 is provided with a set of contacts which, in Fig. 25, is given the general designation 60 but which is not so designated in the circuit drawing of Fig. 26 but shown in association with the coil of each magnet. When, therefore, the latch magnets 51 operate, each of them supplies over one of its front contacts a supplementary holding ground for relay PU, thereby to hold this relay and from it the pull-up magnet 40 at the time when relay CBK operates to indicate that the code bars 32 have been selectively operated, as will be described. With the cards suspended against the pole-pieces 65 of the pull-up magnet 40 and the code bars 32 unlocked for operation by the energization of the latch magnets 51, a ground signal is transmitted to the control apparatus over conductor CC that the code bars may be operated. This signal is supplied from ground on the No. 4 back contacts of relay ARC, serially through the No. 1 contacts of the four latch magnets 51, to said conductor CC. The controlling apparatus accepts the ground on said conductor CC as a signal to selectively ground the code bar operating leads CB1 . . . CB38 in accordance with the code that requires translation. Each of the leads CB1 . . . CB38 (one for each code bar 33) terminates in a relay CBR1 . . . CBR38 which, in turn and when operated, applies battery serially to the two solenoids 36 of a code bar indicated by the relay. Accordingly, when the controlling apparatus selectively grounds conductors CB1 . . . CB38 in accordance with the code to be translated, corresponding relays CBR1 . . . CBR38 are operated, each of which, in turn, completes the circuit of the two solenoids 36 of the involved code bar 33 in the translator, causing the bar to be moved downward.

Each code bar 33 and each card support bar 32 controls a pair of off-normal contacts which are closed when the bar is lowered, and each of these contacts operates a relay SC—, the relays corresponding to each of the thirty-eight code bars 33 being designated SCB1 . . . SCB38, the two relays corresponding to the two card support bars 32 being designated SC1 and SC2. Each of the relays SCB1 . . . SCB38 is provided with a group of contacts by means of which the operation of the involved code bars in the two-out-of-five code previously given is checked, since it is evident that if the code bars have been operated in the two-out-of-five code previously given, then the relays SCB1 . . . SCB38 will likewise be operated in the two-out-of-five code. If the involved code bars 33 have all operated in accordance with the code, and the relays SCB1 . . . SCB38 have been similarly operated, then a circuit is completed for relay CBK, said circuit extending from battery through the winding of said relay, the No. 1 code-check contacts (not shown in detail) through each of the relays SCB38 . . . SCB1, to ground on the back contacts of relay IND1; the latter relay being normal, it will be recalled, if no card is displaced in the stack, and none will be since the pull-up magnet 40, being energized, still causes the cards to be suspended against its pole faces 65, and the distance between the cards so suspended and those that may not be, but supported by the card support bars 32, not being sufficient to effect the closure of the light index channels, or other channels. Relay SR, which is a slow-release relay, is also operated in a circuit from ground on the No. 1 contacts of any operated relays SCB1 . . . SCB38, No. 3 back contacts of relay ARC, winding of relay SR to battery, supplying ground to the control apparatus over conductor LCH. Relay CBK operated, parallels over its No. 7 contacts the contacts on the latch magnet 51 through which ground is maintained on conductor CC, releases relay LCH at its No. 2 contacts which, in turn, releases the latch magnets 51 thus to restore the latch elements 39 and lock all the code bars 33 in whatever condition they may be, opens the circuit of the card support magnets 42 at its No. 2 contacts thus enabling the solenoids 36 of the support bars 32 to be effective when operated, and completes the circuit of relays CS1 and CS2 over its No. 6 contacts to ground on the No. 2 back contacts of relay ARC, said relays CS1 and CS2 then closing obvious circuits for solenoids 36 of the two support bars 32. The off-normal contacts of the latter solenoids operate the two relays SCS1 and SCS2, cutting off the circuit of relay PU which, in releasing, release the pull-up magnet 40 if, in the meanwhile, the latch magnets 51 have released to indicate that the code bars 33 are locked and can accept the descending cards when the deenergization of the pull-up magnet 40 releases them. The deenergization of said pull-up magnet allows the stack of cards to drop to the code bars 33, the one card whose tabs 21 correspond to the pulled down code bars 33 continuing its downward movement until the card rests on the pole faces 62 of the pull-down magnet 41, it being remembered that by the operation of the solenoids 36 for the card support bars 32, said latter bars were pulled down into alignment with the operated code bars.

When the proper combination of code bars 33 has been operated, as indicated by the operation of the code bar check relay CBK, the pull-up magnet 40 and its slave relays PUS1 . . . PUS8 deenergized and the pull-down magnet 41 still energized, the card corresponding to the operated code bars should drop. This is indicated to the control apparatus by a ground applied to conductor RDC over the back contact of relay PU and through the No. 5 contacts of relay CBK. When a card drops properly in the manner previously described, light falling on the two light index channels IND1 and IND2 is cut off. As previously explained, while light is falling on these two channels, the two light index channel circuits shown in Fig. 4 are effective in keeping their respective relays IND1 and IND2 in their unoperated condition. When, however, a card has fallen and relays IND1 and IND2 operate as an indication of the fact, a circuit is completed for relay RD of the output channel circuits shown in Fig. 2, the circuit being traced, in Fig. 26, from ground on the No. 1 contacts of relay IND2, No. 1 contacts of relay IND1, No. 3 contacts of relay CON to relay RD. Also as previously explained in connection with the description of the operation of the channel output circuits, relay RD renders the output channels effective, in that when the control apparatus supplies ground over the front contacts of said relay, a relay OU in said control apparatus is caused to operate for each channel in which light has not been cut off by the dropping of a card. It should be noted that the control apparatus is also given an indication that the card has dropped, by the fact that ground is supplied to conductors IND2 and IND1 extending into the control apparatus, the ground on conductors IND2 tracing from ground on the No. 2 front contacts of relay IND2, the No. 4 contacts of relay CON, the normal contacts of the pull-up slave relays PUS5 . . . PUS8, to conductor IND2. The the ground on conductor IND2 tracing from ground on No. 2 front contacts of relay IND1, No. 1 contacts of relay CON, serially through the contacts of the pull-down slave relays PDS1 . . . PDS8, normal contacts of pull-up slave relays PUS1 . . . PUS4, to conductor IND1. The control apparatus, in response to the signals furnished over conductors IND1 and IND2 that the card has dropped, then proceeds to apply ground over the front contacts of relay RD to make the output channel circuits effective in operating in the control apparatus the involved relays OU corresponding to the desired translation.

When the control apparatus is finished with a card and the latter is to be restored, ground is applied to conductor RST, thereby to cause the operation of relay ARC which locks over its No. 3 front contacts to ground on all the operated relays SCB1 . . . SCB38, SC1 and SC2, thus to insure that this relay will not release until every bar is restored. Relay ARC operate, opens the circuit of relay PD which, in releasing, releases the pull-down magnet 41 and the relays PDS1 . . . PDS8, thus releasing the selected card; it also completes an operating circuit of relay PU from ground on the No. 5 contacts of relay ARC, normal contacts CL3, contacts CL1, winding of relay PU, to battery. The pull-up magnet 41 and its slave relays PUS1 . . . PUS8 are now reenergized as before to lift the cards off the code bars. When relays PUS1 . . . PUS8 have operated, relay LCH is operated over a circuit from battery through its winding, serially through closed contacts on relays PUS1 . . . PUS8, No. 2 front contacts of relay ARC, to ground. Relay LCH now operates the latch magnets 51 which serve to remove the latch elements 39 from over the toes of the feet 38 of the operated code bars to enable them to release upon the deenergization of their associated solenoids 36; grounds conductor ARC over the No. 6 front contacts to the control apparatus, and operates relay CSL from ground on its No. 4 front contacts, thereby causing the operation of magnets 42 to hold the card support bars 32 to receive the cards subsequently to be released by the pull-up magnet 40, and releases relays CS1 and CS2 which, in turn, release the solenoids 36 of the support bars 32.

During the time that the latch magnets 51 are operated, the control apparatus removes ground from the involved code bar conductors CB1 . . . CB38 to release the code bar solenoids 36, and also removes ground from conductor RST to release relay ARC which, however, remains locked so long as any code bar 33 or support bar 32 remains operated, as indicated by the operated condition of relays SCB1 . . . SCB38, SC1 and SC2. The release of any of the above relays opens the operating path of relay CBK which then releases. When all the bars have released, relay ABC is unlocked and releases. Relay CBK in releasing (and with the pull-up slave relays PUS1 . . . PUS8 operated) closes a holding path over its No. 1 contacts for the latch relay LCH from ground on relay SR to hold the latch magnets 51 operated. Relay ARC, releasing, starts relay SR releasing, opens the operating path to relay LCH which, however, remains held operated by relay SR, and opens the operating path to relay PU which remains held operated by the latch magnet contacts. When relay SR eventually releases, the latch magnets 51 are released again to lock the code bars, this time all in their unoperated position. With the release of the latch magnets relay PU releases, in turn releasing the pull-up magnet 51, causing the cards to descend upon the code bars, and releasing the card support magnets 42, thus restoring the translator to normal in readiness for another operation.

While we have illustrated our invention in its application to telephonic switching translations, it should be understood that it is not limited to such application or to the specific arrangements herein disclosed, it being apparent to one skilled in the art that various applications, modifications and arrangements other than those disclosed herein are within the scope of the invention.

The terms and expressions which we have employed in reference to the invention are used as terms of description and not of limitation, and we have no intention in the use of such terms and expressions of excluding thereby equivalents of the features shown and described or portions thereof but, on the contrary, intended to include therein any and all equivalents and modifications which may be employed without departing from the spirit of the invention.

What is claimed is:

1. A translating device comprising in combination with normally disabled translational circuits and a plurality of cards arranged in a stack, of means for selectively displacing a single one of said cards in the stack to a predetermined position, means rendered operable in response to the displacement of said card to said predetermined position, and means responsive to the operation of said last-mentioned means for enabling said translational circuits.

2. A translating device comprising in combination with a plurality of perforated cards arranged in a stack, said perforations producing a number of output channels in the stack for the passage of signal energy therethrough, normally ineffective output devices disposed at the end of each channel for response to signal energy, means for selectively displacing a single one of said cards in the stack to a predetermined position, thereby to reduce the number of channels in the stack to a number individual to said displaced card, means operative in response to the displacement of said card to said predetermined position, and means responsive to the operation of said last-mentioned means for rendering effective those of said output devices which are disposed at the end of the channels remaining after the displacement of said card.

3. A translating device comprising in combination with a plurality of perforated cards arranged in a stack, said perforations producing a number of output channels and a single indicating channel through the stack for the passage of signal energy therethrough, normally ineffective output devices severally disposed at the end of said output channels for response to signal energy transmitted therethrough, a device disposed at the end of said indicating channel responsive to signal energy transmitted therethrough, means for selectively displacing a single one of said cards in the stack to a predetermined position, thereby to reduce the number of output channels in the stack to a number individual to the card displaced to said predetermined position, to shut off said indicating channel to the passage of signal energy therethrough and to release said device, and means responsive to the release of said device for rendering effective said output devices.

4. A translating device comprising in combination with a plurality of perforated cards arranged in a stack, said perforations producing a number of output channels and two indicating channels in the stack for the passage of signal energy through said channels, normally ineffective output devices disposed at the end of each output channel for response to signal energy transmitted through said output channels, a device disposed at the end of each of said two indicating channels responsive to signal energy severally transmitted through said indicating channels, means for selectively displacing a single one of said cards in the stack to a predetermined position, thereby to reduce the number of output channels in the stack to a number individual to the card displaced to said predetermined position, to shut off said indicating channels to the passage of signal energy therethrough and to release each of said devices, and means responsive to the release of both of said devices for rendering effective said output devices.

5. A translating device comprising in combination with a plurality of perforated cards arranged in a stack, said perforations producing a number of output channels and two indicating channels in the stack for the passage of signal energy therethrough, normally ineffective output devices disposed at the end of each output channel for response to signal energy transmitted through said output channels, a device disposed at the end of each of said two indicating channels responsive to signal energy severally transmitted through said indicating channels, means for selectively displacing a single one of said cards in the stack to a predetermined position, thereby to reduce the number of output channels through the stack to a number individual to the card displaced to said predetermined position, to shut off said indicating channels to the passage of signal energy therethrough and to release each of said devices, means responsive to the release of either of said devices for rendering effective said output devices, alarm means, and means responsive to the operated condition of either device and the released condition of the other device for operating said alarm means.

6. A translating device comprising in combination with a plurality of cards held in stacked relation, a plurality of bars selectively operable to displace a card in the stack, and means to lock said bars in the unoperated position and in the operated position, thereby to hold locked in an operated position those bars that are operated and to hold locked in an unoperated position those bars that are unoperated.

7. A translating device comprising in combination with a plurality of cards held in stacked relation, a plurality of bars selectively operable to displace a card in the stack, means for locking unoperated those of said bars which are unoperated and locking operated those of said bars which are operated, and means for operating said last-mentioned means thereby to render said bars operable.

8. A translating device comprising in combination with a plurality of cards held in stacked relation, a plurality of bars upon which said cards normally rest, means for selectively operating said bars, thereby to displace a card in the stack, latching means disposed transversely underneath said bars to lock said bars in the operated or unoperated position, said latching means supporting the weight of all of said cards, and means for operating said latching means, thereby to unlock said bars for operable response to said bar-operating means.

9. A translating device comprising in combination with a plurality of cards held in stacked relation, each of said cards being selectively notched to provide a plurality of tabs in accordance with a code to express one or more items of information, a plurality of code bars upon which said cards normally rest, each card resting on those of said code bars which engage its tabs, means for selectively operating said code bars in a downward direction and in combinations corresponding to the tabs on said cards, whereby the operation of said code bars in a particular combination enables the card having tabs resting on said operated code bars to descend and be displaced in the stack, latching means disposed transversely underneath said bars to lock said bars in the operated or unoperated position, said latching means supporting the weight of all of said cards, and means for operating said latching means, thereby to unlock said bars for operable response to said bar operating means, the subsequent release of said latching operating means restoring said latching means to lock all code bars in their respective operated or non-operated positions.

10. A translating device comprising in combination with a plurality of cards held in stacked relation, a plurality of code bars selectively operable to permit the displacement of a card in the stack, two other movable bars each disposed at the end of and in normal alignment with said code bars, all of said cards normally resting on said code bars and said two other bars, means for lifting said cards off said bars, and means operable to hold said two other bars immovably aligned with said code bars, thereby to support any card that has not been lifted and thus assure that the weight of no card is upon said code bars.

11. A translating device comprising in combination with a plurality of magnetic plates held in stacked relation, a plurality of code bars selectively operable to permit the displacement of a plate in the stack, two other movable bars each disposed at the end of and in normal alignment with said code bars, all of said plates normally resting on said code bars and said two other bars, a pull-up magnet energizable for lifting said plates off all of said bars, and means operable to hold said two other bars immovably aligned with said code bars, thereby to support any plate that has not been lifted and thus assure that the weight of no plate is upon said code bars.

12. A translating device comprising in combination with a plurality of magnetic plates held in stacked relation, a plurality of movable code bars selectively operable to permit the downward displacement of a plate in the stack, two other downwardly movable bars each disposed at the end of and in normal alignment with said code bars, all of said plates normally resting on said code bars and said two other bars, latching means normally effective to lock said code bars in their unoperated position, thereby to cause the weight of said cards to be supported by said latching means, a pull-up magnet energizable to lift said plates off all of said bars, means operable to hold said two other bars immovably aligned with said code bars, thereby to support any plate that has not been lifted and thus assure that the weight of no plate is upon said code bars, means for thereafter operating said latch members to unlock said code bars, thereby to enable the selective operation of said code bars, and circuit means effective upon the operation of said latch operating means for releasing said two bar holding means and for operating said two bars, thereby to cause said two bars to move downwardly and enable one card to descend in the stack in accordance with those code bars which have been operated.

13. A card selecting mechanism comprising a card compartment, a plurality of longitudinal code bars beneath said compartment, the upper edges of said code bars normally disposed substantially in a horizontal plane, a stack of magnetically attractable cards in said compartment resting on said code bars, the lower edges of said cards notched in accordance with select codes, each of said code bars being supported at opposite ends by a retractile spring in combination with a solenoid whereby said bars may be individually lowered, a magnetically operated latch for locking said code bars in either their normal or lowered positions, a pull-up magnet comprising a plurality of coils disposed above said compartment adapted to lift said cards from said bars when said magnet is energized, and a pull-down magnet comprising a plurality of coils disposed beneath said compartment and energizable substantially simultaneously with said pull-up magnet to cause said cards to assume an upright position incident to the effect thereon of the magnetomotive force generated by both of said magnets, and L-shaped pole-pieces for said pull-down magnet to attract and securely hold against the surface thereof a card displaced in the stack corresponding to those of said code bars which are in their lowered position when said pull-up magnet is deenergized and said pull-down magnet continues to be energized.

14. A translating device comprising in combination with a plurality of stackable magnetic cards each provided with end notches that form end grooves when the cards are stacked, a plurality of aligned bars for supporting said plates, a pull-up magnet structure including pole-pieces against which said cards are attracted when the magnet of said structure is energized, manually operable means for lifting said structure, and spring-controlled turnable bails secured to said structure having work edges for engaging the end notches of said cards when said cards are normally resting upon said bars and said bails are turned to engage the notches in all of said cards, whereby upon the raising of said pull-up magnet structure said cards are lifted off of said bars.

15. In a radiant energy information selecting device, a plurality of media having coded areas including signal areas, radiant energy producing means, radiant energy responsive means, means for selectively displacing a single one of said media relative to the others whereby a number of said radiant energy responsive means are selected for response in accordance with the coded areas of said selected media, other energy responsive means, circuit means including said other radiant energy responsive means operable under control of the signal areas of said displaced one of said media for modifying the condition of said circuit means, and means responsive to said circuit means when so modified for enabling the said selected number of said selected radiant energy responsive means to respond.

16. In a device according to claim 15, wherein said circuit means are controlled by the dark or non-responsive condition of said other radiant energy responsive means to enable the response of said selected numbers of radiant energy responsive means.

17. In a device according to claim 16, wherein said signal areas are plural in number and are in widely separated portions of said media for the purpose of checking the completeness of displacement thereof.

References Cited in the file of this patent
UNITED STATES PATENTS

| | | |
|---|---|---|
| 1,753,961 | Zworkin | Apr. 8, 1930 |
| 1,931,852 | Reichel et al. | Oct. 24, 1933 |
| 2,131,911 | Ayres | Oct. 4, 1938 |
| 2,224,646 | Friedman et al. | Dec. 10, 1940 |
| 2,605,965 | Shepherd | Aug. 5, 1952 |
| 2,668,877 | Gent et al. | Feb. 9, 1954 |